United States Patent
Taguchi et al.

[11] Patent Number: 5,771,106
[45] Date of Patent: Jun. 23, 1998

[54] SHADING CORRECTING MEANS FOR IMAGE FORMING APPARATUS

[75] Inventors: Kazushige Taguchi, Saitama; Yutaka Hasegawa, Tokyo; Tsutomu Shouji, Kanagawa, all of Japan

[73] Assignee: Ricoh Company, Ltd., Tokyo, Japan

[21] Appl. No.: 542,504

[22] Filed: Oct. 13, 1995

[30]       Foreign Application Priority Data

Oct. 13, 1994   [JP]   Japan ................................... 6-247582
Oct. 3, 1995    [JP]   Japan ................................... 7-256234

[51] Int. Cl.$^6$ .................................................. H04N 1/407
[52] U.S. Cl. ......................... 358/461; 358/406; 358/504; 358/455; 358/448; 382/312
[58] Field of Search ................... 358/461, 406, 358/504, 505, 474, 455, 448; 399/72, 73, 74; 382/312, 318, 319

[56]               References Cited

U.S. PATENT DOCUMENTS

| | | | |
|---|---|---|---|
| 4,654,723 | 3/1987 | Nagano | 358/483 |
| 4,821,099 | 4/1989 | Sakamoto | 358/461 |
| 4,868,685 | 9/1989 | Ueno | 358/461 |
| 5,038,225 | 8/1991 | Maeshima | 358/461 |
| 5,130,822 | 7/1992 | Nagata et al. | 358/461 |
| 5,151,796 | 9/1992 | Ito et al. | 358/461 |
| 5,325,210 | 6/1994 | Takashima et al. | 358/461 |
| 5,530,239 | 6/1996 | Konishi et al. | 358/475 |

FOREIGN PATENT DOCUMENTS

| | | |
|---|---|---|
| 62-50822 | 3/1987 | Japan . |
| 62-183259 | 8/1987 | Japan . |
| 2-177765 | 7/1990 | Japan . |

*Primary Examiner*—Peter S. Wong
*Assistant Examiner*—Derek J. Jardieu
*Attorney, Agent, or Firm*—Lowe, Price, LeBlanc & Becker

[57]                ABSTRACT

There is provided by the present invention an image forming apparatus including a one-chip microcomputer having white reference data for a first sheet of copy fetched with shading gate arrays in a stable region for a halogen lamp, using said white reference data when forming an image for a first sheet of copy, and also having shading-corrected white data fetched for a second or subsequent sheet of copy each time an image is formed.

7 Claims, 22 Drawing Sheets

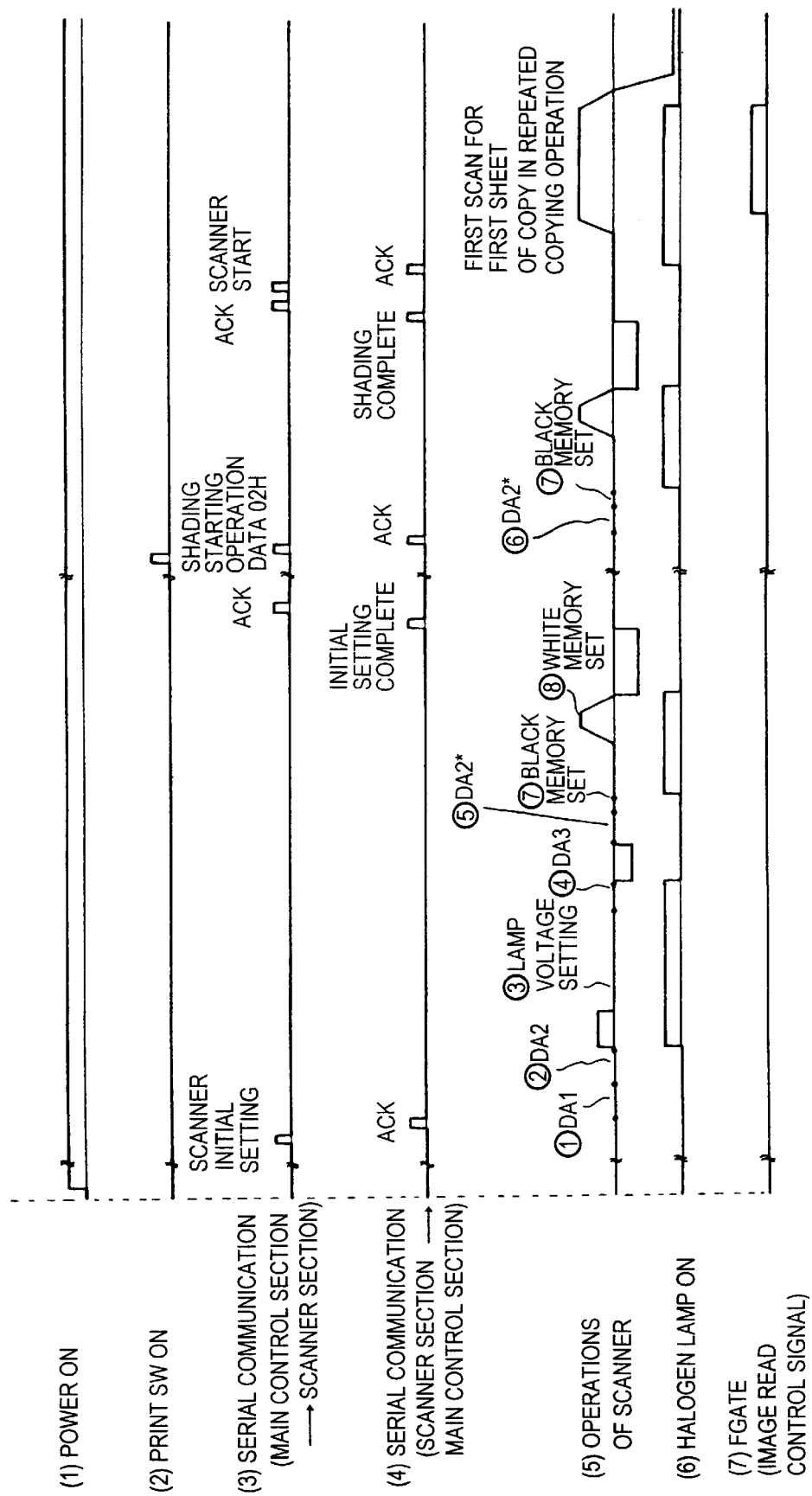

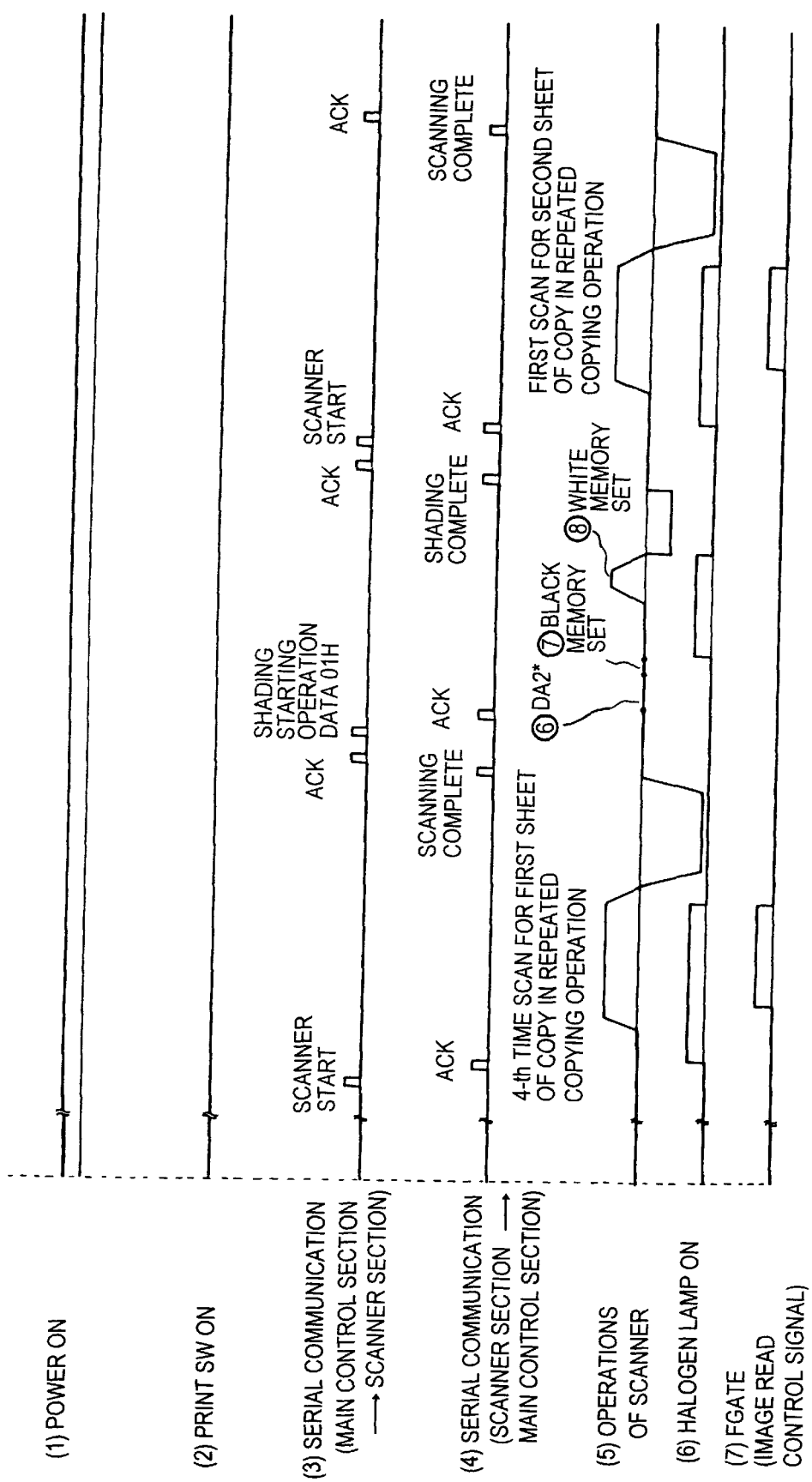

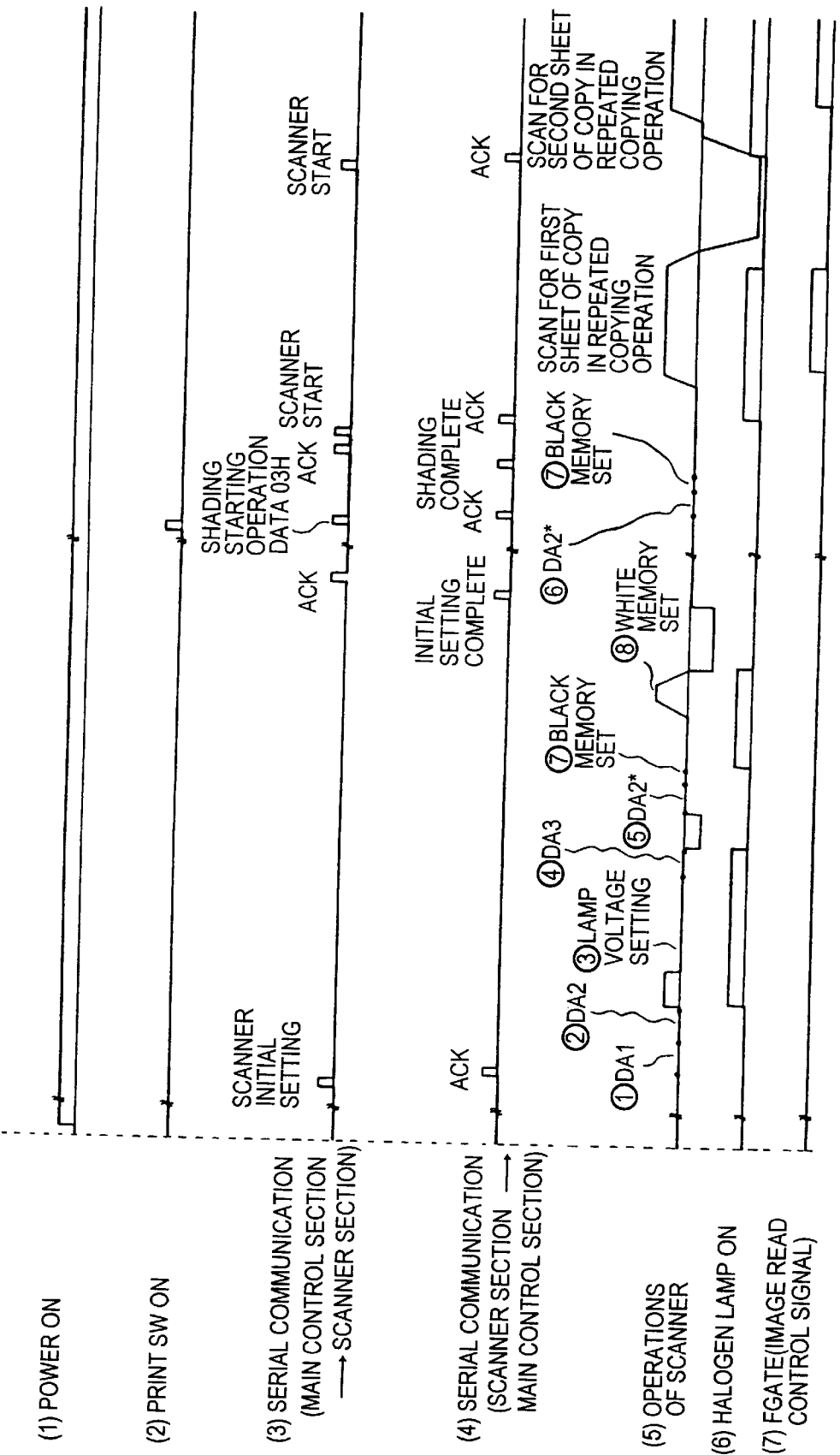

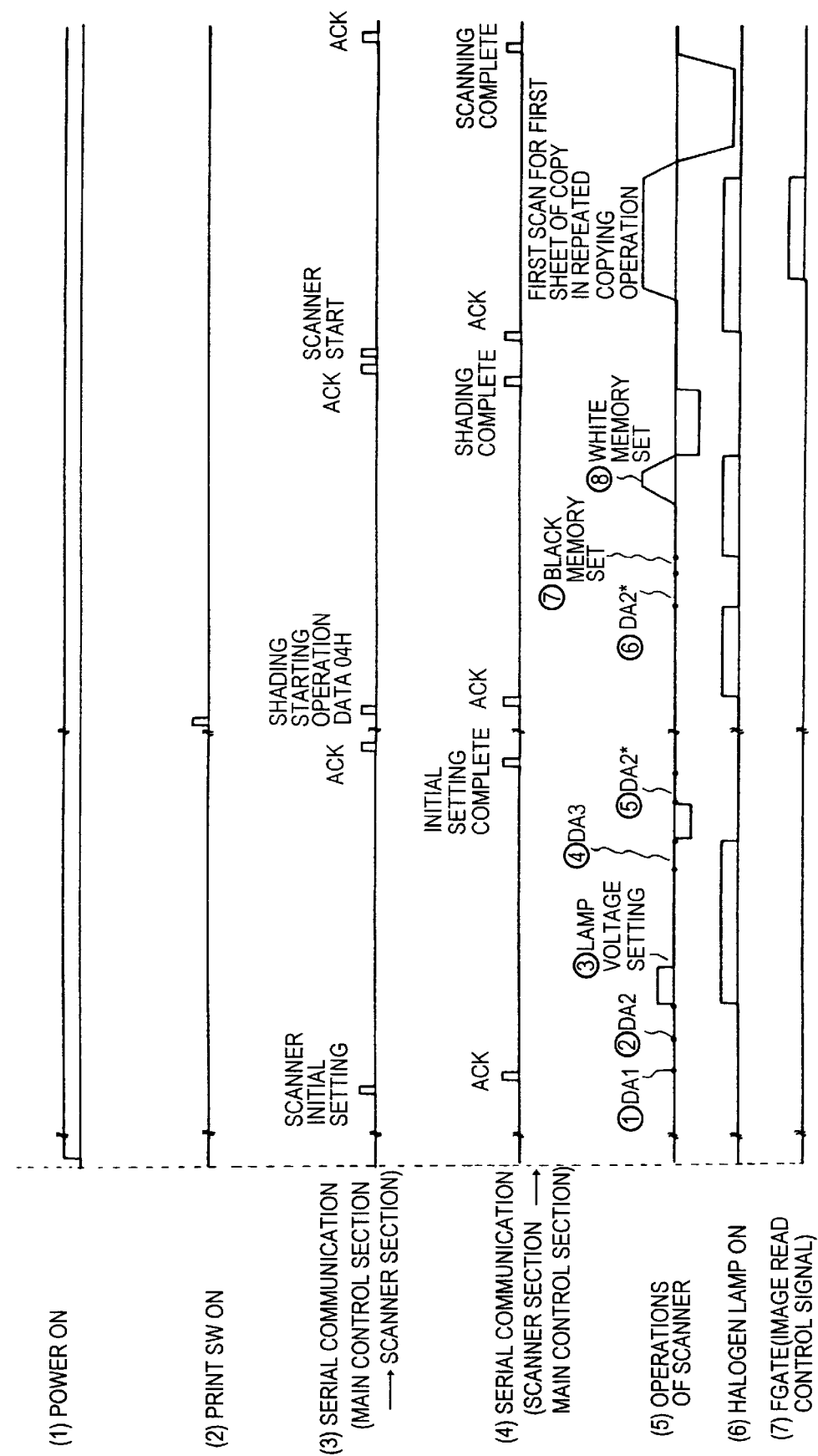

SHADING CORRECTING MEANS FOR IMAGE FORMING APPARATUS

FIELD OF THE INVENTION

The present invention relates to an image forming apparatus such as a digital copying machine, a digital full-color copying machine, or a facsimile, and more particularly to an image forming apparatus in which control for preliminarily lighting up a light source for illumination is executed according to a type of copying mode and white data for shading correction is fetched so that an image quality and a copying speed are improved.

BACKGROUND OF THE INVENTION

Shading correction data fetching in the conventional type of image forming apparatus has been executed, for instance, in the way as described below. Namely, after a print switch is pressed down, white data for shading correcting is fetched and then an operation for forming an image is executed.

Also to reduce effects caused by change in a quantity of light from a halogen lamp for illuminating a draft during lapse of time when copying is executed continuously, white data is fetched each time one image is formed.

The reference technological documents relating to the present invention include, for instance, Japanese Patent Laid-Open Publication No. 50822/1987 disclosing an "Image Forming Apparatus" in which a light quantity detection sensor is used to detect change during a build-up time of a light source and scanning for exposure is started after a stable output from the light source has been obtained.

Also Japanese Patent Laid-Open Publication No. 183259/1987 discloses an image forming apparatus in which an operating speed of a driving unit is set to a lower speed and a time required for a draft image to be fed to a read position is extended when a quantity of light detected by a light quantity measuring means is small.

Furthermore, in a digital reading system Japanese Patent Laid-Open Publication No. 177765/1990 discloses an "Image Reading Apparatus" in which light from a fluorescent lamp is led to a photo diode through an optical fiber, and the output is computed and used as a reference input for an A/D converter.

However, in the conventional type of image forming apparatuses as described above, there have been the problems as described below. Detailed description is made hereinafter.

At first, FIG. 17 and FIG. 18 show image data output values for R, G and B lights in a state where the system is cool due to change in a quantity of light from a halogen lamp and in a state where the system has been warmed up due to change in a quantity of light from a halogen lamp respectively. Data is fetched into a shading white memory in 0.69 sec after the halogen lamp is lit, and comparison between the cool state shown in FIG. 17 and the warmed-up state shown in FIG. 18 shows that the image data difference is higher in the cool state by 3.2% for R, 3.3% for G, and 4.8% for B.

This phenomenon occurs because a section not emitting light (Mo ring) in the Halogen lamp is heated when the halogen lamp is lit and the resistance value increased. For instance, when 6 pieces of Mo ring each having a diameter of 0.43 mm and a length of 44 mm are used, the resistance is 0.017Ω×6 pieces≈0.1Ω.

On the other hand, once a lamp is lit and temperature of an Mo ring goes up to 200° C, the resistance becomes 0.2Ω. Assuming that the rated current is 2.6 A, a voltage drop due to the Mo ring is 0.26 V, and a quantity of light then is $\{(75-0.26)/75\}^{3.38} = 0.988$ meaning that the quantity of light has changed by 1.2%. It should be noted that a change in actually measured values shown in FIG. 17 and FIG. 18 is larger.

Thus change in a quantity of light from a halogen lamp give effects to an operation for fetching shading white data first in a copying sequence in an actual machine (in a state where the machine is still cool) as well as to operations for fetching shading white data second time and on (in a state where at least one scan has been executed and the halogen lamp has been warmed up).

FIG. 19 and FIG. 20 are timing charts each showing operations for fetching shading correction data after a print switch is pressed down as well as for scanning in the conventional type of image forming apparatus.

In FIG. 19, after power is turned ON, the image forming apparatus is initialized, reload and fixing functions are initialized, and then a scanner initial setting command is transmitted from the main control section, when draft image read is enabled because the analog system in the image forming apparatus is automatically set up.

When the system enters a stand-by state until the print switch is pressed down, and during this period, the halogen lamp is kept in a cool state. Then, if the print switch is pressed down and a shading start signal is transmitted from the main control section, and operation for fetching shading correction data is executed.

When white data fetching is executed (white memory reset in ⑧) associated with the shading correction data fetching operation is executed, a quantity of light from the halogen lamp shifts to a slightly higher level and values of read white data becomes higher. If a scanner start signal is transmitted from the main control section in this state, a scanning operation is started, but as the halogen lamp has been warmed up because of the shading correction data fetching operation executed immediately before, a quantity of light becomes lower as compared to that in the cool state.

The shading correction data fetching operation is executed once each time an image is formed, as shown in FIG. 20, and the halogen lamp is warmed up after the first operation is executed, so that values of fetched white data in the operation executed second time and on are different from that executed first time. For this reason values of image data after shading correction fetched in first to fourth scans for a sheet of copy in a repeated copying operation becomes lower as compared to those fetched during scans for a second sheet of copy, and this difference appears as change in image density.

Thus, in the conventional technology, change is generated in a quantity of light from a halogen lamp as a light source due to the internal temperature characteristics, and especially the difference between a high-lighted section and particularly a background section of a first sheet of copied image and those of a second sheet of copied image is substantially large, which disadvantageously makes it impossible to obtain a high quality image.

Also in the conventional technology, a long time is required until a quantity of light emitted from a light source is stabilized, which in turn makes a lead time for copying operation or a time required for first copy disadvantageously longer.

Also in the image reading apparatus disclosed in Japanese Patent Laid-Open Publication No. 50822/1987, amplitude of light emission from the image illuminating light source is detected by a light sensor, and an operation for reading an image is started after the amplitude of light emission is stabilized, but with this configuration, a dedicated light sensor is required, so that a number of necessary parts increases, the productivity becomes lower, reduction of size and weight of the apparatus becomes difficult, and in addition a long time is required until an operation for reading an image is required, and for the reasons as described above, the configuration is not preferable.

Also in the image reading apparatus disclosed in Japanese Patent Laid-Open Publication No. 183259/1987, a quantity of light used for reading an image is kept at a constant level by adjusting a scanning speed of an image reading means in response to change in amplitude of light emitted from the image illuminating light source, but actually it is difficult to keep a quantity of light for reading an image at a constant level through adjustment of a scanning speed of an image reading means as described in this document, and also an actual speed when reading an image becomes lower, so that the configuration is not preferable.

In the image reading apparatus disclosed in Japanese Patent Laid-Open Publication No. 177765/1990, amplitude of light emission of the image illuminating light source is detected by a light sensor, and an output from this light sensor is used as a reference input for an A/D converter, but with this configuration a dedicated light sensor is required, so that a number of required parts increases, the productivity becomes lower, and reduction of size and weight of the apparatus becomes difficult. Especially, in the image reading apparatus disclosed as an embodiment in this publication, light emitted from a fluorescent lamp is delivered through optical fiber to a photodiode, and for this reason it is considered that the sensitivity in detection may be rather low.

SUMMARY OF THE INVENTION

It is a first object of the present invention to realize shading correction which is stable irrespective of a change in a quantity of light due to internal temperature characteristics in a halogen lamp and to obtain high quality images eliminating effects by changes in density of images in a continuous copying mode.

The present invention was made to solve the problems as described above, and it is a second object of the present invention to make possible controls for preliminarily lighting up a halogen lamp according to a desired image output and to realize a faster copying speed.

To achieve the objects as described above, in the image forming apparatus according to the present invention, white reference data for a first sheet of copy after power is turned ON is executed in a stable region for an illuminating means, shading correction is executed by a shading correction means for forming an image for a first sheet of copy, and shading-corrected white data is fetched for a second or subsequent sheet of copy each time one image is formed, and thus shading correction not affected by change in a quantity of light due to a temperature difference between the cool and warm state of an illuminating means can be realized.

In the image forming apparatus according to the present invention, in a case where a full-color copying mode with a manual input means is selected, the illuminating means is preliminarily lit by the scanner control means, shading-corrected white data for each copy is fetched, and in a case where the mono-color copying mode is selected, shading correction is executed without preliminarily lighting up the illuminating means for each copy, and thus the processing time can be reduced by omitting a time for preliminarily lighting up when the mono-color copying mode is selected.

In the image forming apparatus according to the present invention, in a case where the 1 to 1 (1 sheet of copy for 1 sheet of draft) copying mode is selected in the input means, shading correction is executed with the scanner control means without preliminarily lighting up the illuminating means, and in a case where the 1 to N (continuous copying) mode is selected, shading-corrected white data for each copy is executed with preliminarily lighting up the illuminating means, and thus the processing time is reduced by omitting a time required for preliminarily lighting up the illuminating means in the 1 to 1 copying mode.

In the image forming apparatus according to the present invention, if any error in the illuminating means is generated only when shading-corrected white data is fetched, a lamp is turned OFF due to contact fault or thermal fuse in a terminal section of a connecting section of the lamp, and resultantly the white reference data is not available. To respond to this situation, as a processing against an error that the white reference data is not normally fetched, priority is put, when forming an image for a first sheet of copy after the error is overcome, not on a processing against change in density due to fine change in a quantity of light emitted from the lamp, but on simple and faster recovery after the error is overcome.

In the image forming apparatus according to the present invention, if feed paper jamming is generated in the image forming apparatus, power for the AC system is turned OFF to prevent danger or accident in the main control section. With this feature, also power supplied from the lamp regulator is turned OFF, and reliability of the white reference data becomes lower. For this reason, as a processing against an error that the white reference data is not fetched normally, when forming an image for a first sheet of copy, priority is put, when forming an image for a first sheet of copy, not on a processing against change in density due to fine change in a quantity of light from the lamp, but on simple and faster recovery after the jamming is overcome.

In the image forming apparatus according to the present invention, if a door is opened during operation of machine in the image forming apparatus, power for the AC system is turned OFF to prevent danger or accident in the main control section. With this operation, also power from the lamp regulator is turned OFF, and reliability of the white reference data becomes lower. For this reason, as a processing against an error that the white reference data is not normally fetched, when forming an image for a first sheet of copy, priority is put not on a processing against change in density due to fine change in a quantity of light from the lamp, but an easy and faster recovery from the door is closed.

In the image processing apparatus according to the present invention, if an error is generated in the main body of the image forming apparatus and a service man is called, power for the AC system is turned OFF to prevent danger or accident in the main control section. With this operation, also power from the lamp regulator is turned OFF, and reliability of the white reference data becomes lower. For this reason, as a processing against an error that the white reference data is not fetched normally, when forming an image for a first sheet of copy after the error in the main body is overcome, priority is put not on a processing against change in density due to fine change in a quantity of light emitted from the lamp, but an easy and faster recovery after the error in the main body is overcome.

In the image forming apparatus according to the present invention, in a case where there are a plurality of illuminating means, a form of shading varies for each illuminating means, so that the white reference data must be fetched again after switching of the illuminating means. With this, even if the illuminating means is switched, accurate shading correction can be executed.

In the image forming apparatus according to the present invention, as general examples of illuminating means switching, there are the normal (reflected light) mode in which an image is read by checking the reflected light, or transmitted light mode in which an image is formed by checking back light or transmitted light from a film projected, and it is necessary to execute correction suited to each shading form, and the image forming apparatus provides the controls.

In the image forming apparatus according to the present invention, after recovery from various types of error or the illuminating means is switched, the lamp is preliminarily lit up, and thus high precision shading data is obtained.

In the image forming apparatus according to the present invention, when the start detecting driving of the he fact that driving of the image illuminating light source by the illumination driving means is started after a prespecified period of time has passed, the light emission correcting means reduces power to be supplied from the illumination driving means to the image illuminating light source according to correction data previously set up in the data storage means, and for this reason it is possible to prevent change in amplitude of light emitted from the image illuminating light source associated with lapse of time so that no change will occur in shading correction.

In the image forming apparatus according to the present invention, data stored in the data storage means can freely be rewritten, so that correction data can freely be set in the data storage means.

In the image forming apparatus according to the present invention, the data collecting means controls power supplied to the illumination driving means at a constant level, first and second reference data are detected by photoelectrically converting reflected light from a density reference member illuminated by the image illuminating light source repeatedly, correction data is computed by the data computing means depending on the first and section reference data, and the correction data is stored by the data storing means in the data storage means, and thus appropriate correction data is automatically set in the data storage means.

In the image forming apparatus according to the present invention, when the start detecting means detects the fact that driving of the image illuminating light source is started by the illumination driving means after a prespecified reference period of time has passed, the conversion correcting means increases a reference voltage for an A/D converting means according to the correction data previously set in the data storage means, so that no change will occur in shading correction even if amplitude of light emitted from the image illuminating light source changes in association with lapse of time.

In the image forming apparatus according to the present invention, data stored in the data storage means can freely be rewritten, so that correction data can freely be set in the data storage means.

In the image forming apparatus according to the present invention, power supplied to the illumination driving means is controlled by the data collection means at a constant level, first and second reference data is detected by photoelectrically converting the reflected light from the image illuminating light source repeatedly, correction data is computed by the data computing means depending on the first and second reference data, and the correction data is stored by the data storing means in the data storage means, and thus appropriate correction is automatically set in the storage means.

Other objects and features of this invention will become understood from the following description with reference to the accompanying drawings.

BRIEF DESCRIPTION OF THE DRAWINGS

FIG. 4 is a timing chart showing operations in the present invention for fetching shading correction data and for scanning after a print switch is pressed;

FIG. 5 is a timing chart showing operations in the present invention for fetching shading correction data and for scanning after a print switch is pressed;

FIG. 6 is a timing chart showing control in the present invention when a black and white image is formed;

FIG. 7 is a timing chart showing operations according to a shading command transmitted to a scanner section when a value of operation data is 04H;

DESCRIPTION OF THE PREFERRED EMBODIMENTS

Figure 1:
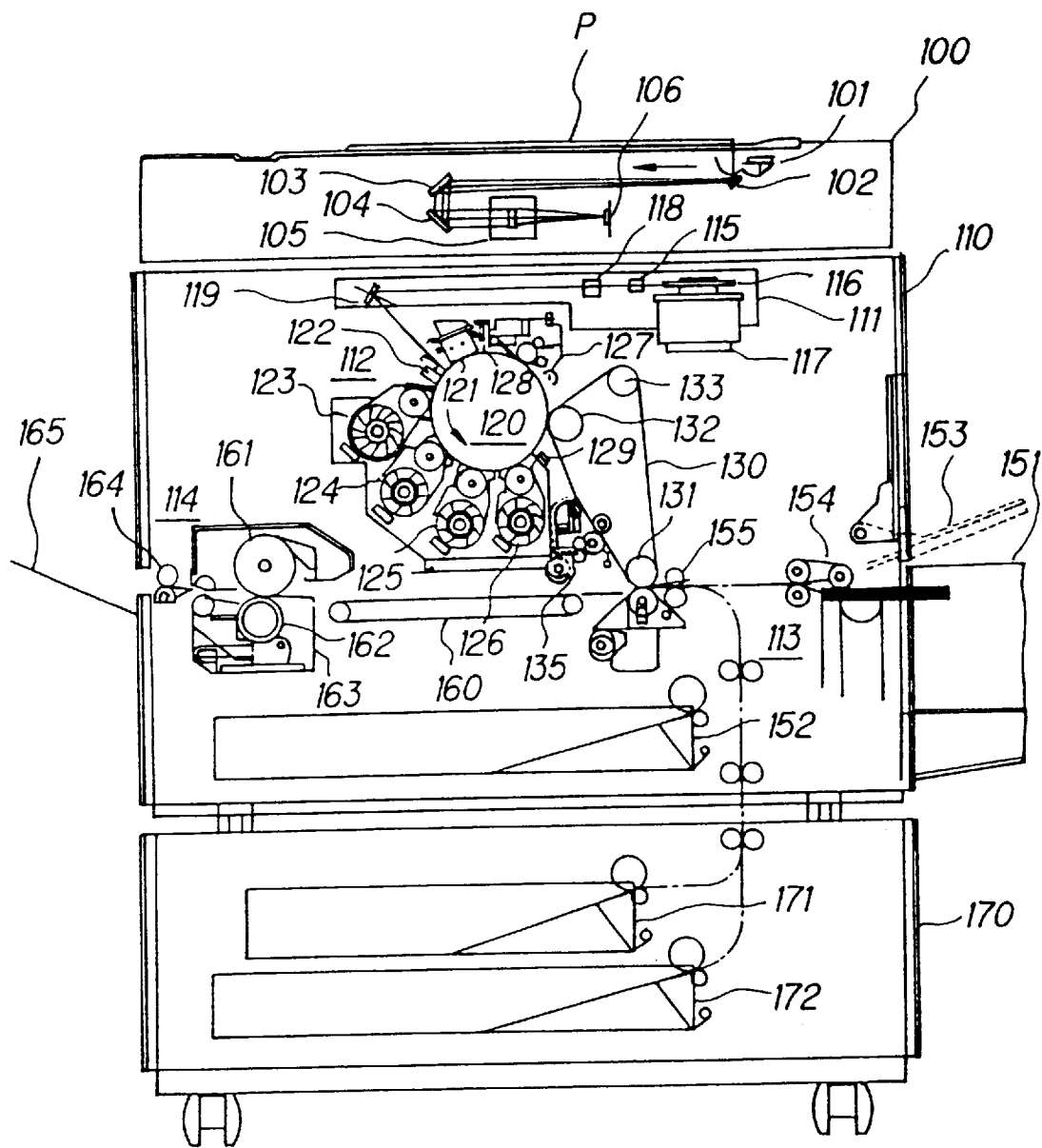
FIG. 1 is an explanatory view showing configuration of a digital full color copying machine being optimal for application thereto of the present invention.
Figure 2:
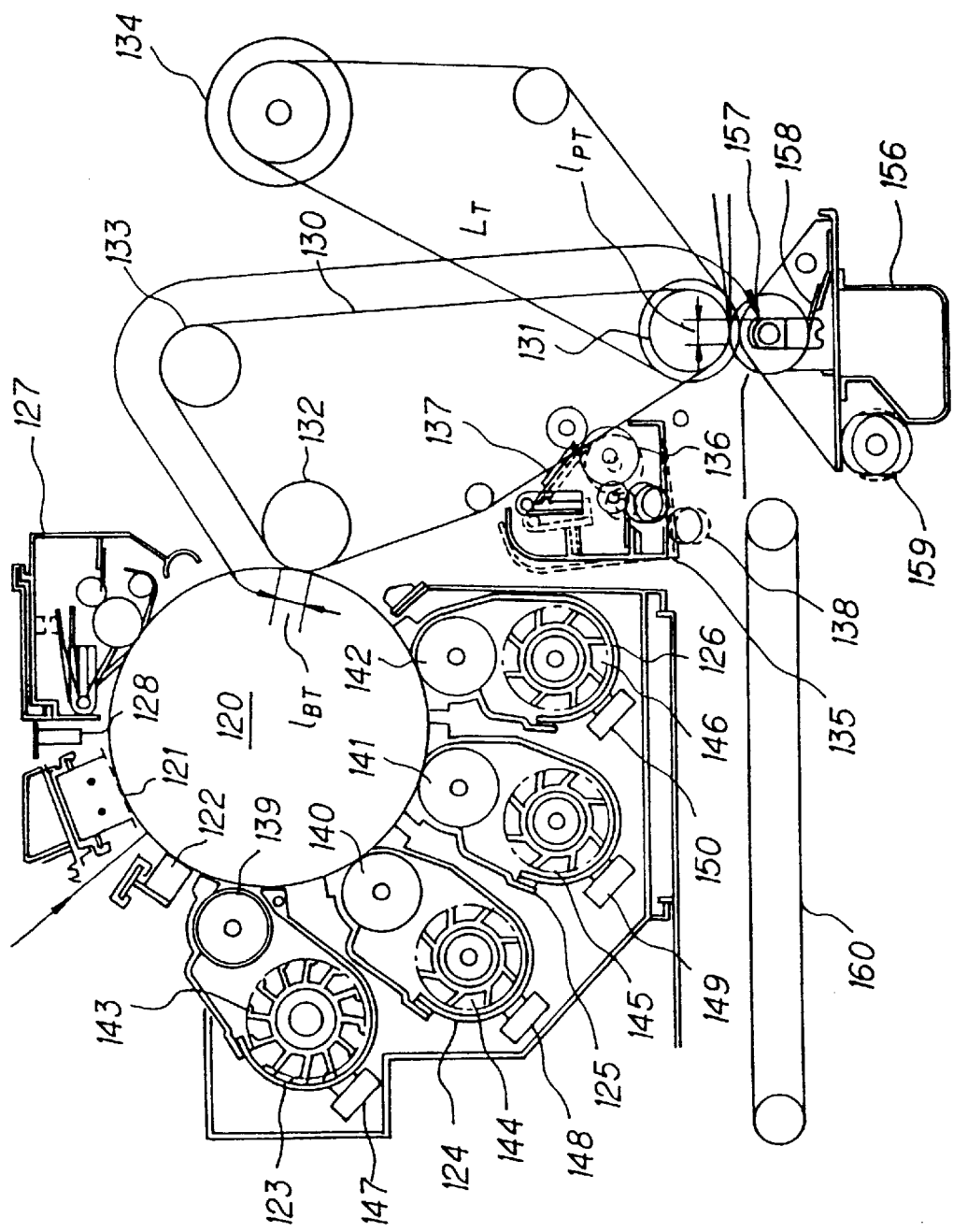
FIG. 2 is an explanatory view showing partial configuration of an image forming section as well as an intermediate transfer belt section thereof.

Next, a description is made for an embodiment of the present invention with reference to the related drawings. FIG. 1 is an explanatory view showing configuration of a digital full-color copying machine. FIG. 2 is an explanatory view showing partial configuration of an image forming section as well as an intermediate transfer belt section.

This digital full-color copying machine largely comprises a color image reading device 100 (called color scanner hereinafter), and a color image recording device 110 (called color printer hereinafter), and in this embodiment, a paper feeder 170 for increasing a paper feed rate is provided therein.

The color scanner 100 comprises a halogen lamp 101 as an illuminating means for illuminating a draft P, a first mirror 102, a second mirror 103, a third mirror 104, an image-forming lens 105 each for guiding reflected light from the draft P, and a 3-line CCD (Charge Coupled Device) 106 as a photoelectric converting means having a function of a color sensor which converts light focused through the image-forming lens 105 to image signals, namely a function for resolving the light to blue (B), green (G), and red (R) colors for making it possible to simultaneously read the three colors.

The color printer 110 largely comprises an optically writing unit 111, an image forming section 112, a paper feed section 113, and a fixing/discharging section 114.

The optically writing unit 111 is a box-shaped unit comprising a laser 115 using a semiconductor laser, a laser driving control plate (not shown) for the laser, a polygon mirror 116, a polygon motor 117 for rotating the polygon mirror 116, an f/θ lens 118, and a reflection mirror 119.

The image-forming section 112 has the following functional sections around a light-sensing drum 120 forming an electrostatic latent image as a center. Herein designated at the reference numeral 121 is an electrifying charger for uniformly electrifying the light-sensing drum 120, at 122 an electric potential sensor for detecting a surface potential of the light-sensing drum 120, at 123 a Bk developing unit for black toner, at 124 a C developing unit for cyan toner, at 125 an M developing unit for Magenta toner, at 126 a Y developing unit for yellow toner, at 127 a light-sensing cleaning unit for removing or recovering toner or other materials remaining on the light-sensing drum 120, and a pre-cleaning decharger is provided therein.

Also designated at the reference numeral 128 is a charge-removing lamp for removing residual charge in the light-sensing drum 120, and at 129 is a development density pattern detector.

Designated at the reference numeral 130 is an intermediate transfer belt unit spanned with a driving roller 131, a belt transfer bias roller 132, and a slave roller 133, which can be driven by a belt driving motor 134.

A belt cleaning unit 135 is provided in this intermediate transfer belt unit 130, and the belt cleaning unit 135 comprises a brush roller 136, a rubber blade 137, and a mechanism 138 for movement to or away from the intermediate transfer belt unit 130.

Each of the developing units 123 to 126 comprises, as shown in FIG. 2, a Bk development sleeve 139, a C development sleeve 140, an M development sleeve 141, a Y development sleeve 142 each rotating with pieces containing developer for developing an electrostatic latent image on the light-sensing drum 120 contacted to a surface of the light-sensing drum 120, development paddles 143 to 146 each for pumping up and agitating the developer, and toner density detection sensors 147 to 150 for detecting a density of the toner in the developer.

The paper feed section 113 comprises a paper feed cassette 151, a paper feed cassette 152, and a manual paper feed tray 153 for having specific paper such as film for OHP manually fed sheet by sheet. Also designated at the reference numeral 154 is a paper feed roller for feeding recording paper for the paper feed cassette 151, and at 155 a resist roller for transferring the recording paper synchronizing to an image on the intermediate transfer belt unit 130.

Also designated at the reference numeral 156 is a paper transfer unit, and this paper transfer unit 156 comprises a paper transfer bias roller 157, a roller cleaning blade 158, and a mechanism 159 for movement to or away from the belt. The reference numeral 160 indicates a carrier belt for carrying recording paper after transfer.

The fixing/discharging section 114 comprises a fixing unit 163 having a fixing roller 161 with a fixing heater incorporated therein and a pressurizing roller 162 energized with a prespecified pressure against the fixing roller 161, a paper discharge roller 164, and a discharged paper tray 165. A paper feeder 170 comprises paper feed cassettes 171, 172.

Next, a description is made for operations in the image forming apparatus having the configuration as described above. The color scanner 100 scans a draft leftward as indicated by the arrow mark when it received a scanner start signal synchronized to operations of the color printer 110, and obtains image data for one color in each scan. An image on the draft P is illuminated by the halogen lamp 101, and the reflected light is focused via the first mirror 102, second mirror 103, third mirror 104 by the image-forming lens 105 onto the 3-line CCD 106.

This operation is repeatedly executed totally 4 times, and image data for 4 colors are successively obtained. And, color image data for the draft P is read each time resolution for blue, green, or red colors is execution, and is converted to electric image signals. Then, a processing for color conversion is executed in the IPC section for image processing (Refer to FIG. 3), and color data for black (described as Bk hereinafter), cyan (described as C hereinafter), Magenta (described as M hereinafter) and yellow (described as Y hereinafter) is obtained.

This color data is visualized to Bk, C, M and Y by the color printer 110 each time color resolution for each color is executed, and a final color copy is provided. Detailed description is made for the processing sequence below. The optically writing unit 111 converts color image data from the color scanner 100 to optical signals, executes optically writing in response to the draft image, and forms an electrostatic latent image on the light-sensing drum 120.

In the standing-by state, all of the 4 developing units 123 to 126 are kept in a printing-disabled state on the developing sleeves 139 to 142, and in the following development it is assumed that a sequence of development operations is in the order of Bk, C, M, and Y. It should be noted that the developing sequence is not limited to that described herein.

When a copying operation is started, an operation for reading Bk image data by the color scanner 110 is started at a prespecified timing, and optically writing and latent image forming with laser light is started according to the image data. Herein an electrostatic latent image formed according to the Bk image data is called a Bk latent image later. It should be noted that the same processing is executed to C, M, and Y image data.

To enable development of this Bk latent image from its tip section, before the tip section of the latent image reaches a developing position of the Bk developing unit 123, the Bk development sleeve 139 is rotated to enable development with developer, and the Bk latent image is developed with the Bk toner.

Then an operation for developing an area of the Bk latent image is continued, but when a rear edge section of the latent image passes the Bk developing position, the developing piece of the Bk development sleeve 139 is quickly separated from the light-sensing body to disable development with the Bk toner. This operation must be completed at latest before a tip section of a C latent image based on the C image data reaches the developing position.

It should be noted that this operation for separating the developing piece of the Bk development sleeve is executed by changing a rotational direction of the Bk development sleeve 139 to a direction contrary to that during the developing operation.

The Bk toner image formed on the light-sensing drum 120 is transferred to a surface of the intermediate transfer belt unit 130 being driven at the same speed as that of the light-sensing drum 120. Then, the image transfer is executed by loading a prespecified bias voltage to the transfer bias roller 132 in a state where the light-sensing drum 120 contacts the intermediate transfer belt unit 130.

It should be noted that, on the intermediate transfer belt unit 130, Bk, C, M and Y toner images successively formed on the light sensing drum 120 are positionally aligned on the same surface to form belt transfer images with 4 colors superimposed therein, and the images are transferred on recording paper in batch. Operations of this intermediate transfer belt unit 130 are described later.

In the side of light-sensing drum 120, next to a processing for Bk image data, a processing for C image data is started, and reading of the C image data by the color scanner 100 is started at a prespecified timing, and the image data is optically written to form a C latent image.

The C developing unit 124 starts rotation of the C development sleeve 140 after a rear edge section of the Bk latent image passes the developing position and also before a front edge of the C latent image reaches the developing position to enable development with developer, and develops the C latent image with C toner.

Then development of an area of the C latent area is continued, and at a point of time when the rear edge section of the latent image passed the developing position, like in case of a processing by the Bk developing unit 123 described above, development by the developing pieces on a tip of the C development sleeve 140 is disabled. This operation is also finished before a front edge section of the M latent image coming next reaches the developing position.

As for processes for processing M and Y image data, operations for reading each image data and those for forming and developing a latent image are the same as those executed in the processes for processing the Bk and C image data described above, so that description of the operations is omitted herein.

The intermediate transfer belt unit 130 is rotated and driven by the belt driving motor 134. The bias roller 157 in the paper transfer unit 156 is normally kept separated from a surface of the intermediate transfer belt unit 130, but is pressed by the mechanism 159 to the surface at a timing when the 4-color superimposed images transferred and formed on the surface of the intermediate transfer belt unit 130 is transferred in batch to recording paper, and a pre-specified level of bias voltage is loaded to the bias roller 157, thus the image being transferred onto the recording paper.

Also this recording paper is fed by the paper feed roller 154 from the paper feed cassette 151 at a timing when a front edge section of the 4-color superimposed image on the surface of the intermediate transfer belt unit 130 reaches via the resist roller 155 to a position for paper transfer position.

Next detailed description is made for operations of the intermediate transfer belt unit 130. The intermediate transfer belt unit 130 operates, after transfer of the Bk color image as a first color image has been executed up to its read edge section, in the following three types of operation mode. Operations of the intermediate transfer belt unit 130 are executed in one of the three operation modes, or in an appropriate combination thereof according to a copy size for speeding up the copying operation. Description is made below for each of the operation modes.

(1) Constant speed/reciprocal movement mode

In this mode, even after the Bk toner data is transferred to the belt, the intermediate transfer belt unit 130 continues its reciprocal movement at a constant speed. Then, when a front edge section of the Bk image on a surface of the intermediate transfer belt unit 130 reaches a belt transfer position in a section contacting the light-sensing drum 120 again, image formation is executed at a timing when a front edge section of the next C toner image on the light-sensing drum 120 comes to the position.

As a result, the C image is accurately aligned with the Bk image and transferred on the intermediate transfer belt unit 130 being superimposed on the Bk image. Then also the M and Y images are processed through the same operations, thus a belt transfer image with 4 colors superimposed therein being obtained. Next to the processing for transferring the fourth color (yellow) toner image onto the intermediate transfer belt unit, the toner image with 4 colors superimposed therein on the belt is transferred in batch to recording paper with the reciprocal movement of the intermediate transfer belt unit is continued.

(2) Skipping reciprocal movement mode

When transfer of the Bk toner image to the intermediate transfer belt unit 130 is over, the intermediate transfer belt unit 130 is moved away from the light-sensing drum 120 and is skipped at a high speed in a direction of the reciprocal movement, and after the intermediate transfer belt 130 has been moved by a prespecified distance, the speed of reciprocal movement is returned to the original speed. Then the intermediate transfer belt unit 130 is contacted to the light-sensing drum 120 again.

Then, when a front edge section of the Bk image on a surface of the intermediate transfer belt unit 130 reaches the belt transfer position again, image formation is executed at a timing when a front edge section of the next C toner image coincides with the position. As a result, the C image is accurately aligned wit the Bk image in the side of light-sensing drum 120, and thus 4 color images are simultaneously transferred to the intermediate transfer belt unit 130.

Then M and Y images are also processed through the same operations as those described above, and a belt transfer image with 4 colors superimposed therein is obtained. Next to the processing for transferring the fourth (yellow) color image to the intermediate transfer belt unit 130, the toner image with 4 colors superimposed therein on the intermediate transfer belt unit 130 is transferred in batch to recording paper.

(3) Reciprocal movement (quick return) mode

When the Bk toner image has been transferred onto the intermediate transfer belt, the intermediate transfer belt unit 130 is moved away from a surface of the light-sensing drum 120. And the reciprocal movement is stopped and the intermediate transfer belt unit is returned at a high speed.

This returning movement is stopped after a front edge position of the Bk image on a surface of the intermediate transfer belt unit 130 passes through the belt transfer position in the contrary direction and has moved by a prespecified distance, and then the intermediate transfer belt unit 130 enters the stand-by state.

Then at a timing when a front edge section of a C toner image on the light-sensing drum 120 reaches a prespecified position before the belt transfer position, reciprocal movement of the intermediate transfer belt unit 130 is started again. Also the intermediate transfer belt unit 130 is again contacted to a surface of the light-sensing drum 120.

Also in this case, the C image is accurately aligned so that it is superimposed to the Bk image on a surface of the intermediate transfer belt unit 130, and then transferred to the intermediate transfer belt unit 130. Then also M and Y images are processed through the same operations, thus a belt transfer image with 4 colors superimposed therein being obtained. Next to an operation for transferring the fourth color (Y) toner image to the intermediate transfer belt, the intermediate transfer belt unit 130 continues its reciprocal movement without returning and transfers the toner image with 4 colors superimposed therein in batch to recording paper.

By the way, the recording paper with the toner image with 4 colors superimposed therein from a surface of the intermediate transfer belt unit 130 in the operation mode as described above is carried by a carriage belt 160 into the fixing unit 136.

In the fixing unit 136, the toner image on the recording paper is fused and fixed by the fixing roller 161 with the temperature adjusted to a prespecified degree as well as by a pressurizing roller 162 energized by a prespecified level of pressure. Then this recording paper is discharged by paper discharge roller 164 onto the discharged paper tray 165, thus a final full-color copy being obtained.

On the other hand, a surface of the light-sensing drum 120 after an image has been transferred to the belt therefrom is cleaned by the light-sensing body cleaning unit 127 with the residual electric charge removed by the charge removing lamp 128, thus being ready for the next cycle of copying operation.

Also the belt cleaning unit 135 is pressed by the mechanism 135 against a surface of the intermediate transfer belt unit 130 with a toner image having been removed onto recording paper, and the surface is cleaned.

In the repeated copying mode, operations of the color scanner 100 and image formation on the light-sensing drum 120 for a Bk (first color) image for a second sheet of copy are executed automatically at a prespecified timing in succession to a process for forming a Y (fourth color) image for a first sheet of copy.

Also in succession to a process for transferring an image with 4 colors superimposed therein for a first sheet of copy from the intermediate transfer belt unit 130 to recording paper, a Bk toner image for a second sheet of copy is transferred to an area having been cleaned by the belt cleaning unit 135 on a surface of the intermediate transfer belt unit 130. Then the same processing as that for a first sheet of copy is executed.

It should be noted that the above description assumes a copy mode for preparing a full color copy comprising 4 colors, and in a 3-color copy mode or in a 2-color copy mode, the operation cycle described above is repeatedly executed according to a number of colors as well as to a specified number of times of copying.

In a case of mono-color copying mode, only a developing unit for the object color is set in the enabled state until a specified number of copies are prepared.

The intermediate transfer belt unit 130 is reciprocally driven at a constant speed in a state where it contacts a surface of the light-sensing drum 120. Also the belt cleaning unit 135 executes a mono-color copying operation in a state where it contacts the intermediate transfer belt unit 130.

Figure 3:
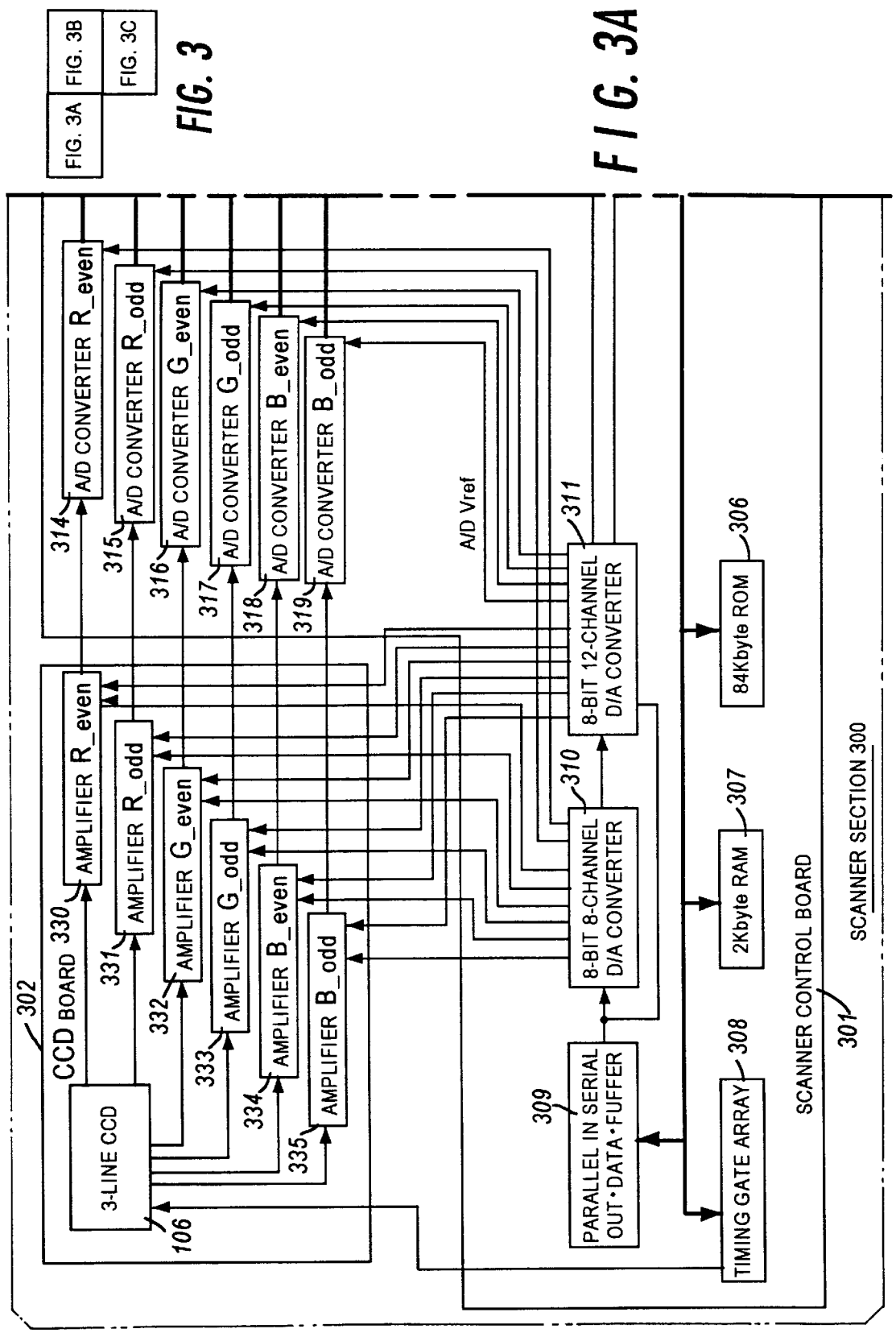
FIGS. 3A–3C are a block diagram showing configuration of a control system for a color scanner according to the present invention.
Figure 3B:
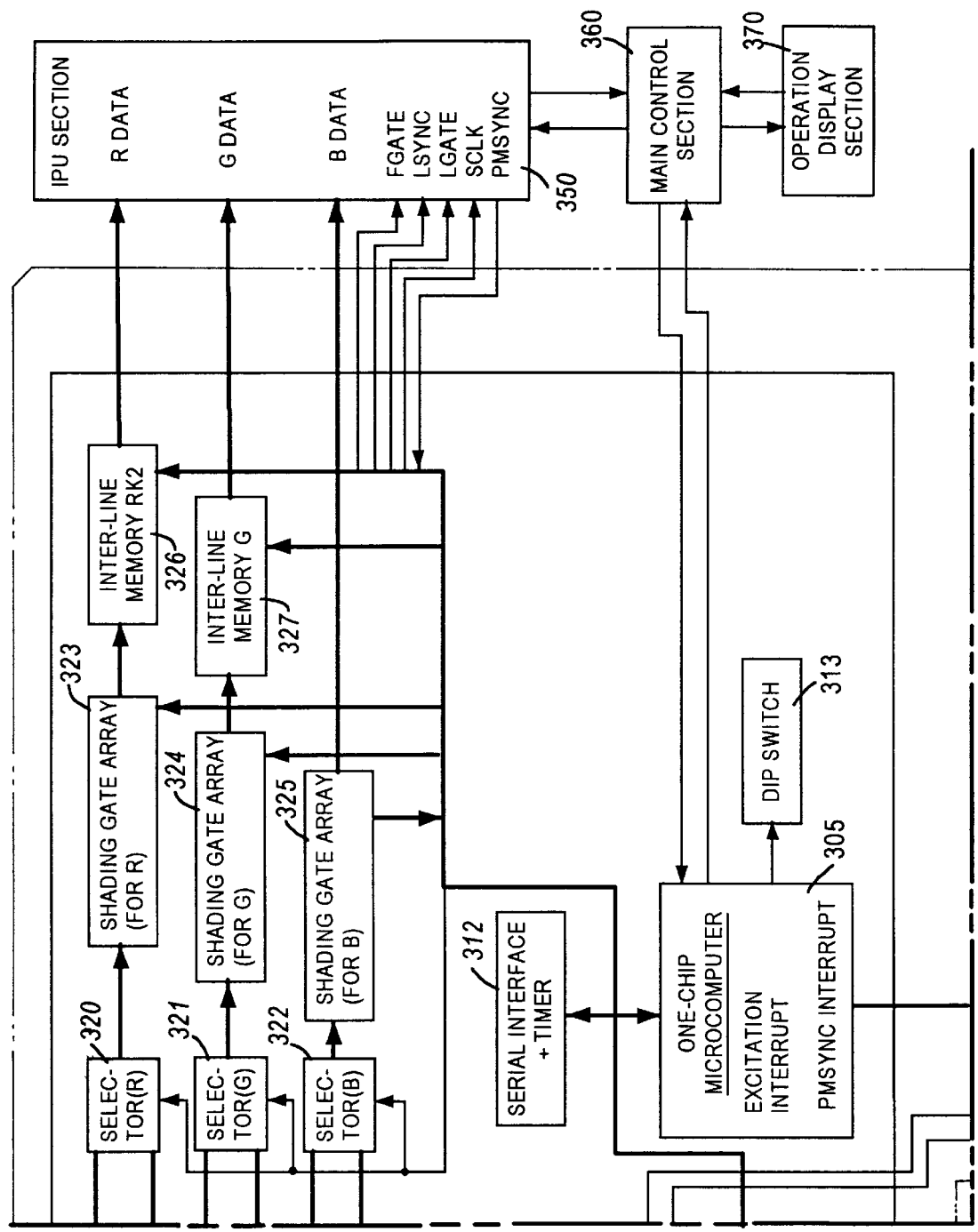
Figure 3C:
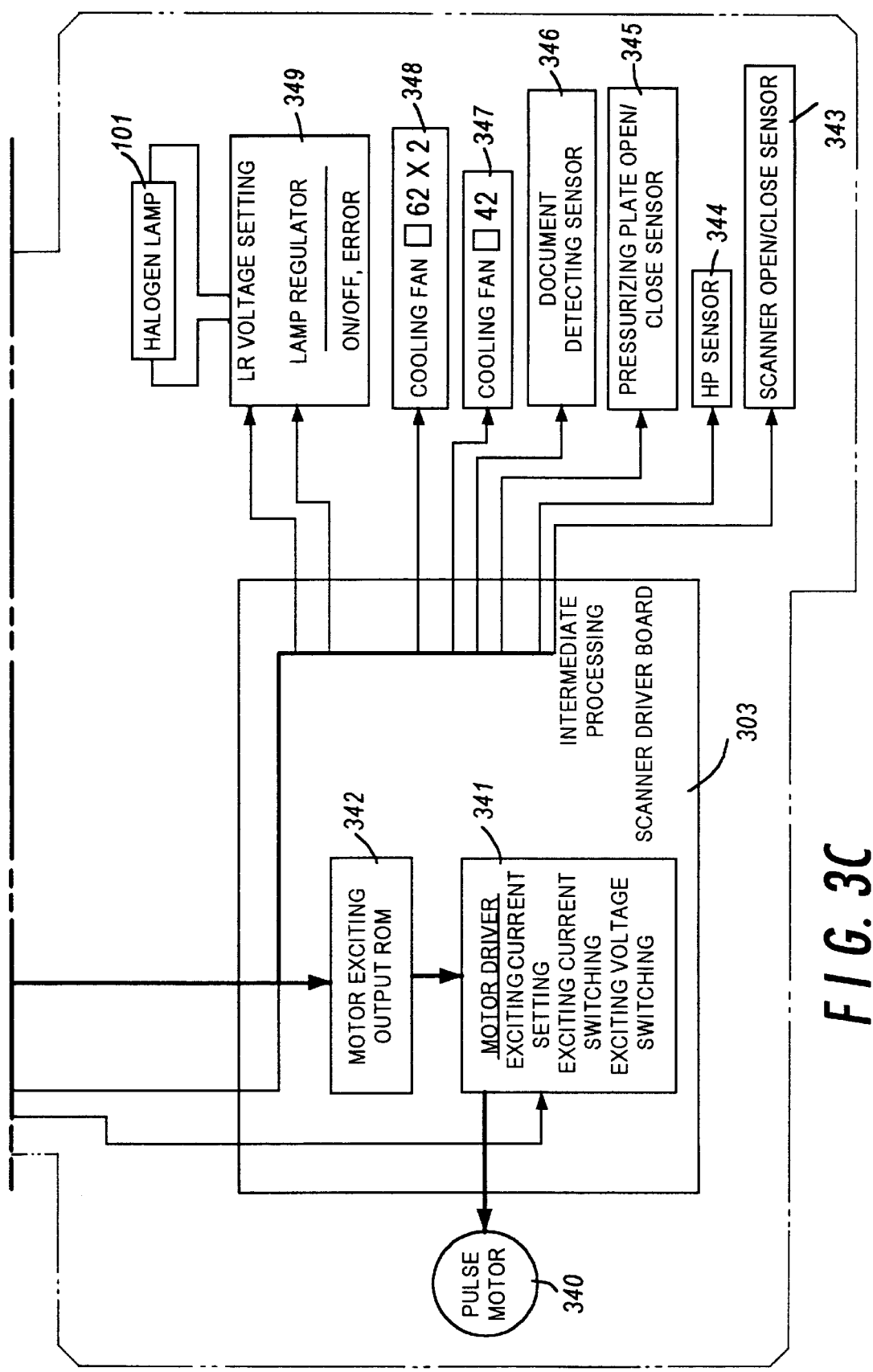

FIG. 3 is a block diagram showing configuration of a control system for the color scanner 100 according to the present invention. Main functions of the control system include ① motor control, ② automatic setting for analog system, ③ setting for digital signal processing, ④ processing for detecting a draft, and ⑤ response to a projector. To realize the functions as described above, a control board in the scanner section 300 largely comprises a scanner control board 301, a CCD board 302, and a scanner driver board 303.

Also in the figure, designated at the reference numeral 350 is an IPU (Image Processing Unit) section, at 360 a main control section for controlling each unit in the entire image forming apparatus, at 370 an operation display section comprising key groups, LEDs, and touch panel keys or others for setting copying conditions, setting each operating mode, and displaying the operating conditions as described above.

The scanner control board 301 comprises a one-chip microcomputer 305 (called "microcomputer" hereinafter) incorporating therein a CPU, a ROM, a RAM or the like each as a scanner controlling means, a ROM 306 with a control program stored therein, a RAM 307 used as a work memory or the like during control, a timing gate array 308 incorporating therein an FGATE start counter, a parallel-in serial-out data buffer 309 connected through a bus to the microcomputer 305 and outputting serial data, an 8-channel D/A converter, a 12-channel D/A converter 311, a serial interface+timer 312, and a dip switch 313.

Furthermore the scanner control board 301 comprises an A/D converter 314 for R (even), an A/D converter 315 for R (odd), an A/D converter 316 for G (even), and A/D converter 317 for G (odd), an A/D converter 318 for B (even), an A/D converter 319 for B (odd), a selector for R, a selector 321 for G, a selector 322 for B, each as a digital conversion means, and a shading gate array 323 for R, a shading gate array 324 for G, a shading gate array 325 for B, an inter-lime memory 326 for R, and an inter-line memory 327 for G each as a shading correction means.

The CCD board 302 comprises a 3-line CCD 106, an amplifier 330 for R (even), an amplifier 331 for R (odd), an amplifier 332 for G (even), an amplifier 333 for G (odd), an amplifier 334 for B (even), and an amplifier 355 for B (odd) each as an amplifying means.

The scanner board 303 comprises a motor driver 341 for controlling driving of the pulse motor 340, a motor excitation output ROM 342 with motor excitation patterns stored therein, and a relay processing section connected to each sensor.

Connected to the relay processing mode in the scanner driver board 303 described above are a scanner open/closed sensor 343, an HP (home position) sensor 344, a pressurizing plate open/closed sensor 345 for detecting whether a draft pressurizing plate is open or closed, draft detection sensor 346 for detecting whether a draft exists or not, cooling fans 347, 348 for suppressing temperature rise inside the apparatus, and a lamp regulator 348 for lighting up or turning off the halogen lamp as an illuminating means.

Next description is made for operations in the configuration described above. The microcomputer 305 on the scanner control board 301 provides controls according to a control program stored in the ROM 306 and controls the scanner section as a whole by storing intermediate data in the RAM 307 and reading the data therefrom.

The microcomputer 305 is connected to the main control section 360 through serial communications, and executes instructed operations through transaction of commands and data.

Furthermore the main control section 360 is connected to the operation display section 370 through serial communications, and instructions for operating modes or other operating parameters can be set therein according to key entry by a user.

The microcomputer 305 provides through the scanner driver board 303 for relay processing controls over detecting operations and ON/OFF of the lamp regulator 349 as an I/O, draft detection sensor 346, HP sensor 344, pressurizing plate open/close sensor 345, cooling fans 347, 348, scanner open/close sensor 343 or the like.

The scanner driver board 303 generates an excitation pulse sequence with the motor excitation output ROM 342 outputting a decoded motor excitation pattern according to a port output from the microcomputer 305 to drive the pulse motor 340 for driving draft scan. Also the motor driver 341 provides controls over switching of an exciting voltage for high speed driving as well a an exciting current for reduction of vibration.

Optical signals for a draft image corresponding to a quantity of light outputted from the halogen lamp 101 driven by the lamp regulator 349 pass through a plurality of mirrors 102 to 104 and the focusing lens 105, thus the draft image being focused on the 3-line CCD 106 on the CCD board 302. This 3-line CCD 106 receives each driving clock from the timing gate array 308 in the scanner driver board 303 and outputs analog image signals to the amplifiers 330 to 335.

This timing gate array 308 has counting started according to an output port signal from the microcomputer 305 incorporating an FGATE start counter for counting PMSYNC signals. With this operation, an FGATE for the image red control signal is generated. A feedback voltage for black level adjustment as well as for dark current correction is loaded to the amplifiers 330 to 335 on the CCD board 302.

These amplifiers 330 to 335 are driven by the 8-channel D/A converter 310 and 12-channel D/A converter 311 according to serial data from the parallel-in serial out data buffer 309 connected through a bus to the microcomputer 305.

With this feedback voltage, analog image data obtained by subjecting the black levels 1, 2 (offset by DA1 and DA2) outputted from the amplifiers 330 to 335 is inputted to the A/D converter s 314 to 319 on the scanner control board 301. A reference voltage Vref for each of the AD converter s 314 to 319 is adjusted (by DA3) according to voltages from the D/A converter s 310, 311 described above to respond to a gain of the analog image data.

The A/D converter s 314 to 319 convert input signals to digital signals with ODD (odd number field) and EVEN (even number field) digitally synthesized in the selectors 326 to 322, and the digital signals are inputted into the shading gate arrays 323 to 325. Each of the shading gate arrays 323 to 325 has a function to correct nonuniformity in a quantity of light in the illumination system or dispersion in pixel output from the 3-line CCD 106.

Also the shading gate arrays 323 to 325 execute black correction for setting output data in a memory (black memory which is not shown herein) connected to the shading gate arrays 323 to 325 when the halogen lamp 101 is turned OFF.

Furthermore, the shading gate arrays 323 to 325 execute white correction for setting output data in a memory (white memory which is not shown herein) connected to the shading gate arrays 323 to 325 when the halogen lamp is lit up in the density reference board (white reference board). Image read data is computed and processed according to the data stored in the black and white memories, and data subjected to shading correction is outputted.

Also, each of the shading gate arrays 323 to 325 has two functions in addition to the function for shading correction. Namely the shading gate arrays 323 to 325 obtains an additional average for successive 8 pixels, namely image data for 1 line according to a gate signal, and stores the maximum values for ODD and EVEN in an internal register.

In addition, each of the shading gate arrays 323 to 325 has a first function to read data from the microcomputer 305 connected thereto through a bus. Furthermore, each of the shading gate arrays 323 to 325 has a second function to output b image data not subjected to shading correction (for data through mode).

The image data subjected to shading correction is inputted into the inter-line correction memories 326, 327, where time delay between B and G image data for a number of lines and that between B and R image data on the 3-line CCD 106 is adjusted thereby for positional alignment between B, G, and R read images, and is outputted to the IPU section 350. It should be noted that setting of the inter-line memories 326, 327 is controlled by the timing gate array 308 according to a magnification (read speed).

Next, a description is made for automatic setting for the analog system. When power is turned ON, the 3-line CCD 106 is energized, and when the temperature is risen to a certain level, a scanner initial setting command for automatically setting the analog system from main control section 360 is transmitted through the serial communication line to the microcomputer 305.

When this scanner initial setting command is received, the scanner section 300 at first transmits an ACK signal to the main control section 360, and then the microcomputer executes initial setting according to the following sequence;

① rough adjustment for black level offsetting (DA1)

② fine adjustment for black level offsetting (DA2)

③ voltage setting for the halogen lamp 101

④ reference voltage setting for A/D converter s 314 to 319 (DA3)

⑤ fine re-adjustment for black level offsetting (DA2*)

Next, a description is made for each of the operations above.

① Rough adjustment for black level offsetting (DA1)

The scanner section 300 has a black level image signal inputted at a home position (HP) where the halogen lamp 101 is turned OFF and external light does not come in. During this process, the reference voltage for each of the A/D converter s 314 to 319 is kept at a constant value, and rough adjustment (DA1) for changing the D/A converter values for black level offset adjustment in the amplifiers 330 to 335 so that the maximum value for black level detected by a maximum value detecting function of each of the shading gate arrays 323 to 325 is, for instance, 8 or below.

② Fine adjustment for black level offsetting (DA2)

After rough adjustment for black level offsetting (DA1) is finished, adjustment for black level offsetting by a fine adjustment terminal in each of the amplifiers 330 to 335, namely fine adjustment of the D/A converter values (DA2) is executed. In this case the maximum value for black level is fed back, for instance, as 4 or below.

③ Voltage setting for the halogen lamp 101

In a state where rough adjustment (by DA1) and fine adjustment (by DA2) for black level offsetting have been set, all the reference voltages for the A/D converter s 314 to 319 are set to a same value, and the halogen lamp 101 is lit with a prespecified reference voltage under the white reference board (white plate provided at an edge section of a contact glass not shown herein).

The microcomputer 305 reads a value of the maximum value detector/register in each of the shading gate arrays 323 to 325 and adjusts a voltage for the lamp by adjusting a values for the D/A converter s 310, 311 connected to a lamp voltage for the halogen lamp 101 so that the maximum values of ODD and EVEN for each of R, G, and B colors will be a specified reference value.

④ Setting of reference voltages for A/D converter s 314 to 319 (DA3)

After the lamp voltage for the halogen lamp 101 has been decided, reference voltages Vref for A/D converter s 314 to 319 corresponding to values registered in the maximum value register for ODD and EVEN for each color are set. With this operation, dispersion in output level for each of R, G, and B lights as well as in difference between ODD and EVEN is corrected. ⑤ Fine re-adjustment for black level offsetting (DA2*)

After the reference voltages for A/D converter s 314 to 319 have been decided, fine adjustment for black level is executed again (by DA2) for improving precision of the black level.

With the initial setting as described above, it becomes possible to read images. Next, a description is made for shading correction by setting parameters for digital signal processing. When the print switch in the operation display section 370 is pressed down, a shading start command is transmitted through the main control section 360 to the microcomputer 305 in the scanner section 300. Then the scanner section 300 executes an operation for fetching shading correction data.

To execute the operation for fetching the shading correction data, at first the fine re-adjustment for black level offsetting during initial setting described above (⑤) (DA2*) is executed (⑥). Then a value obtained by averaging the black data for 16 lens is stored (⑦) in black memories in the shading gate arrays 323 to 325 at OFF and HP positions for the halogen lamp 101.

Then the halogen lamp 101 is lit with a voltage set in step ③ during initial setting, the pulse motor (scanner motor) 340 is driven for scanning under the white reference board, and an average value of white data for the 16 lines is stored in the white memory (⑧). Operations up to the step are executed in the data through mode for the shading gate arrays 323 to 325.

Also when executing shading correction to read image data, the operating mode is switched to the image data mode. With this operation, it becomes possible to execute computing for shading correction as described below as well as to obtain corrected image data during the normal scanning operation. Namely computing for shading correction is executed through the following equation:

shading-corrected image data=[{(raw image data)−(black data)}÷{(white data)−(black data)}]×255

Then, concrete description is made for the present invention. In the preset invention, to suppress change in shading correction data (resultantly, change in image density) generated due to a difference between cool and warm states of the halogen lamp 101 (a difference of internal temperature therein), which has been a problem to be solved, operation for shading correction data fetching is executed, as described below.

FIG. 4 and FIG. 5 are timing charts each showing operations for fetching shading correction data as well as for scanning after the print switch is pressed down in the present invention. Herein, as shown in FIGS. 4 and 5, fetching white data is executed first in the most stable state of the halogen lamp 101, namely after an analog system is automatically set, and subsequent operations for fetching white data are executed when the halogen lamp 101 has been warmed up enough.

Then when the press switch is pressed down and a shading start signal is received, DA2* ⑥ and black memory set ⑦ are executed to correct a dark current in the 3-line CCD 106. White memory set is not executed, but preliminary lighting up is executed to warm up the halogen lamp 101.

Also, in this timing chart, an operation for traveling to the white reference board is not omitted, but it can be omitted, and in this case, a period of time required for traveling/returning thereto/therefrom can be shortened, and a speed for copying a first sheet of copy can be made faster. The timing chart in this embodiment is shown in FIG. 13 and FIG. 5.

Figure 13:
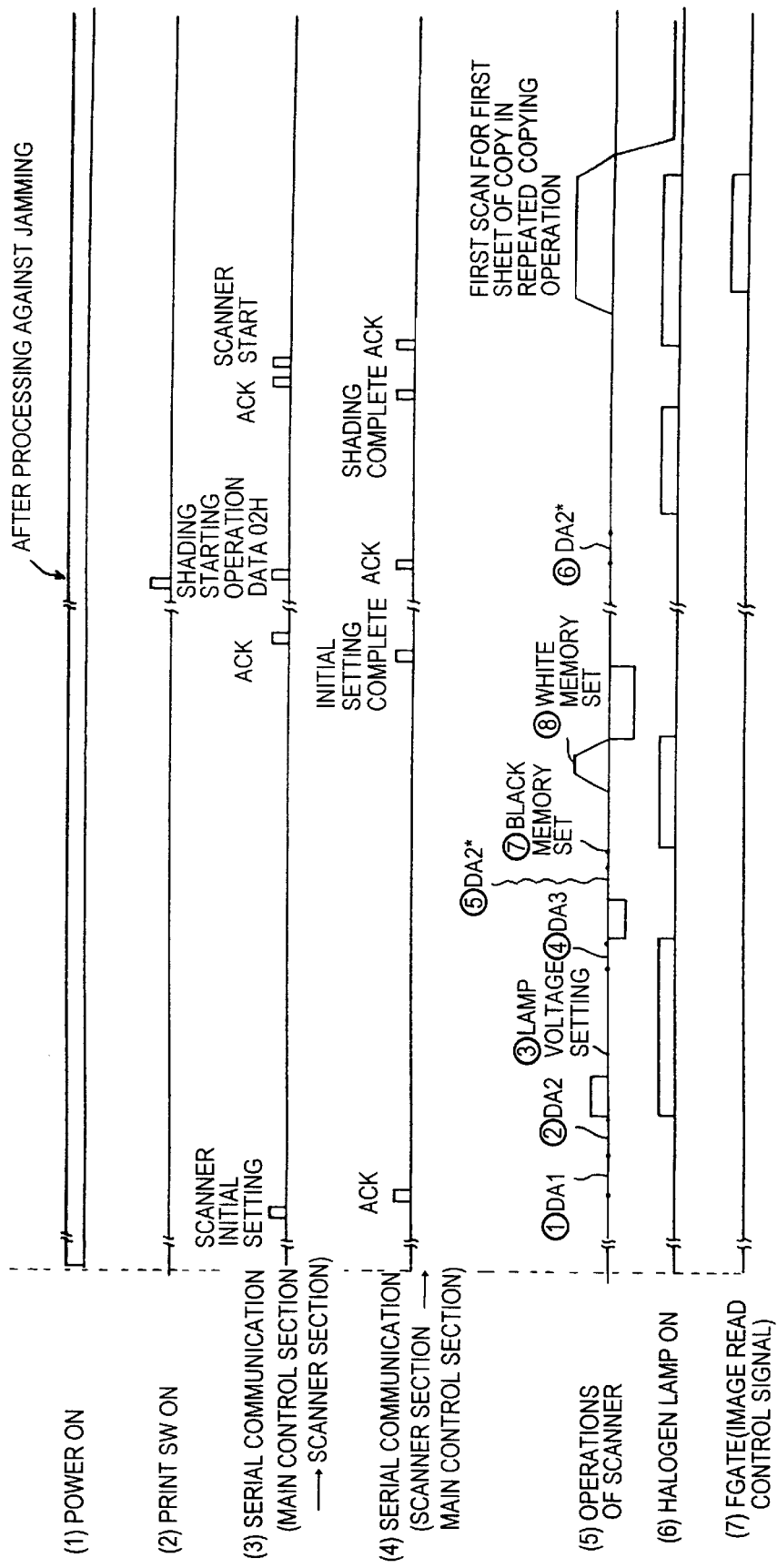
FIG. 13 is a timing chart showing operations in a case where black memory setting is not executed either after a shading start signal is received, namely in a case where black data preset in initialization of a scanner is used.

It should be noted that, the embodiment shown in FIG. 13 and FIG. 5 is a case where black memory set is not also executed after a shading start 02H is received, namely a case where black data set during initialization of scanner is used.

Although it is conceivable that black shading itself by means of black memory setting is not executed at all, because, for instance, dispersion of pixels at a black level in the CCD is rather small, which case not referred to in description of the embodiment, but in this case also, white shading can be affected thereby, so that also this case is within a scope of application of the present invention.

Then, when a scanner start signal is received, a first scan for a first sheet of copy in a repeated copying operation is started, and shading correction for image data is executed by white memory set data stored during initialization as well as to black memory set data before start of scanning operation. White data is fetched each time one image is formed for a second sheet and on and the latest data is used. With this configuration effects over change in a quantity of light caused by temperature characteristics of the halogen lamp can be suppressed.

Thus, it is not known when the print switch is pressed down in the stand-by state, so that the halogen lamp 101 is kept in the cool state. When the print switch is pressed down in this state, white data for first shading correction is not fetched, but by computing shading correction using the white data set during initialization, stable white data can be obtained.

Also, shading correction for a second or subsequent sheet of copy is computed by using white data obtained through the operations for fetching shading correction data each time one image is formed, so that the latest data is used during continuous copying operation, and for this reason high quality images not affected by change in density can be obtained.

Furthermore, when the halogen lamp 101 is lit for an operation for fetching shading correction data for a first sheet of copy in a repeated copying operation, white data is not fetched, but it is effective as a preliminary lighting up to warm up the halogen lamp 101.

By the way, by providing the controls as described above, full-color image forming in which color reproduction is improved and change in density in a repeated copying operation is suppressed can be executed, but there sometimes occurs a case where a remarkable effect can not be obtained or is not required because background in a highlighted section is removed and an image is formed with mono-color. In that case, priority should preferably be put not on preliminarily lighting up the halogen lamp 101 spending a long time, but on realizing a faster copying speed from a view point of practicability. Description is made for this point with reference to FIG. 6.

FIG. 6 is a timing chart showing a control when a black and white image is formed in the present invention. In the figure, the print switch is pressed down and a shading start signal is received, and then, when DA2* ⑥ and black memory set ⑦ are executed and a shading end signal is transmitted, a scanner start signal is transmitted from the main control section 360, and scanning for a first sheet of copy in a repeated copying operation is executed.

When a black and white image is formed, a comparatively short time is required even to prepare 99 sheets of copy in a repeated copying operation, so that, because increase of a dark current in a 3-line CCD 106 is small and also because of the reason as described above, operations for fetching shading correction data for each copy can be omitted, which makes it possible to increase a speed for continuous copying.

Next, a description is made for an embodiment of mode-key entry for operation display section 370. Even when a full-color image is formed, it is necessary for a user to select freely any operating mode with key-entry to the operation display section 370 according to a case where color reproduction is considered to be the most important to the user or a case where identification of color may be enough or to other cases.

For instance, assuming that the normal mode (default) indicates a mode in which a halogen lamp 101 is not preliminarily lit up, a key for a high-light reproduction mode is set, and in a case where this high-light reproduction mode key is pressed down, the halogen lamp 101 is preliminarily lit up, and operation for scanning is executed.

In this case, the operation described above may be executed together with changing γ characteristics (density characteristics) of the color scanner 100 and γ characteristics (density characteristics) of the color printer 110.

When the high-light reproduction mode key (not shown) of the operation display section 370 is pressed down, mode data is transmitted to the main control section 360 through a serial communication line. Then when the print switch is pressed down, the main control section 360 transmits a shading start command to the scanner section 300. The shading start command is structured by 2 bytes and comprises code data and operation data.

In the main control section 360, data 02H for execution of preliminary lighting up as operating data is transmitted to the scanner section 300 together with code data 24H according to a result of the key-entry as described above. A microcomputer 305 in the scanner section 300 having received these data does not execute white memory set shown in FIG. 4, but executes operations including preliminarily lighting up the halogen lamp 101.

In a case of normal mode, namely in a case where key-setting as described above is not executed, operation for not preliminary lighting up as shown in FIG. 6 is executed as operating data 03H for shading start command. When operating data 01H for shading command for a second sheet and on is received, operations for white memory set as shown in FIG. 5 are executed.

In contrast to the operation as described above, if it is assumed that the normal mode (default) is mode in which the halogen lamp is preliminarily lit up, a priority key for first copying is set, and when this key is pressed down, a specified operation is executed to terminate the processing sequence without preliminarily lighting up the halogen lamp according to operating data 03H for a shading command. In this case, a value of default becomes operating data 02H and operations for preliminarily lighting up are executed.

In a case of a mode (high-speed transfer mode or low shading mode) in which a number of bits for a read image is decreased in image formation or image transfer to an image memory to speed up transfer of image data from the scanner section 300, operation according to the shading start command described above is executed without preliminarily lighting up the lamp. This switching to an operation with or without preliminary lighting up is realized by setting a value of operating data for the shading command when a key-entry and the transfer mode are selected.

Furthermore, in a case where a number to be operated is set to 2 or more by inputting with a ten-key in the operation display section 370, like in the description above, preliminary lighting up is executed according to a value of operating data 02H for the shading command determined in the main control section 360 and which transfers the data to the scanner section 300, and when the 1 to 1 copying mode is selected, operation for preliminarily lighting up is not to be executed according to the value of operating data 03H.

FIG. 7 is a timing chart showing operations executed when a value of operating data for the shading command transmitting to the scanner section is 04H. Herein preliminarily lighting up the halogen lamp 101 is executed and then normal shading operation is executed. In this case, a copying speed becomes lower, but according to various modes as described above, for instance, by switching to either mode for preliminarily lighting up the halogen lamp 101 or for not, the copying speed causing no trouble in actual use is insured.

Next, a description is made for operations executed when any error is generated and illumination is switched. After recovery from any error or paper jamming or door-open in the illumination system or the main body system, and furthermore after switching for illumination from normal mode for reading a draft with reflected light therefrom to transmitted draft mode in which a draft is read by checking the back light and a film projector used for reading a transmitted draft, and furthermore in a case of switching back to the reflected draft mode therefrom, there is the possibility that inconvenience as described below is generated in each embodiment described above.

For instance, in a case where feed paper jamming is generated when copying is executed in a continuously repeated operation, an AC current is turned OFF in the main control section for safety. If white data fetching happens to be executed in this moment, the fetching is executed in the lamp-OFF state. The shading is executed with the data obtained from this state for a first sheet of copy after processing for solving the jamming (after its recovery), and as a result of the operation, a copy with nearly white is outputted.

Figure 8:
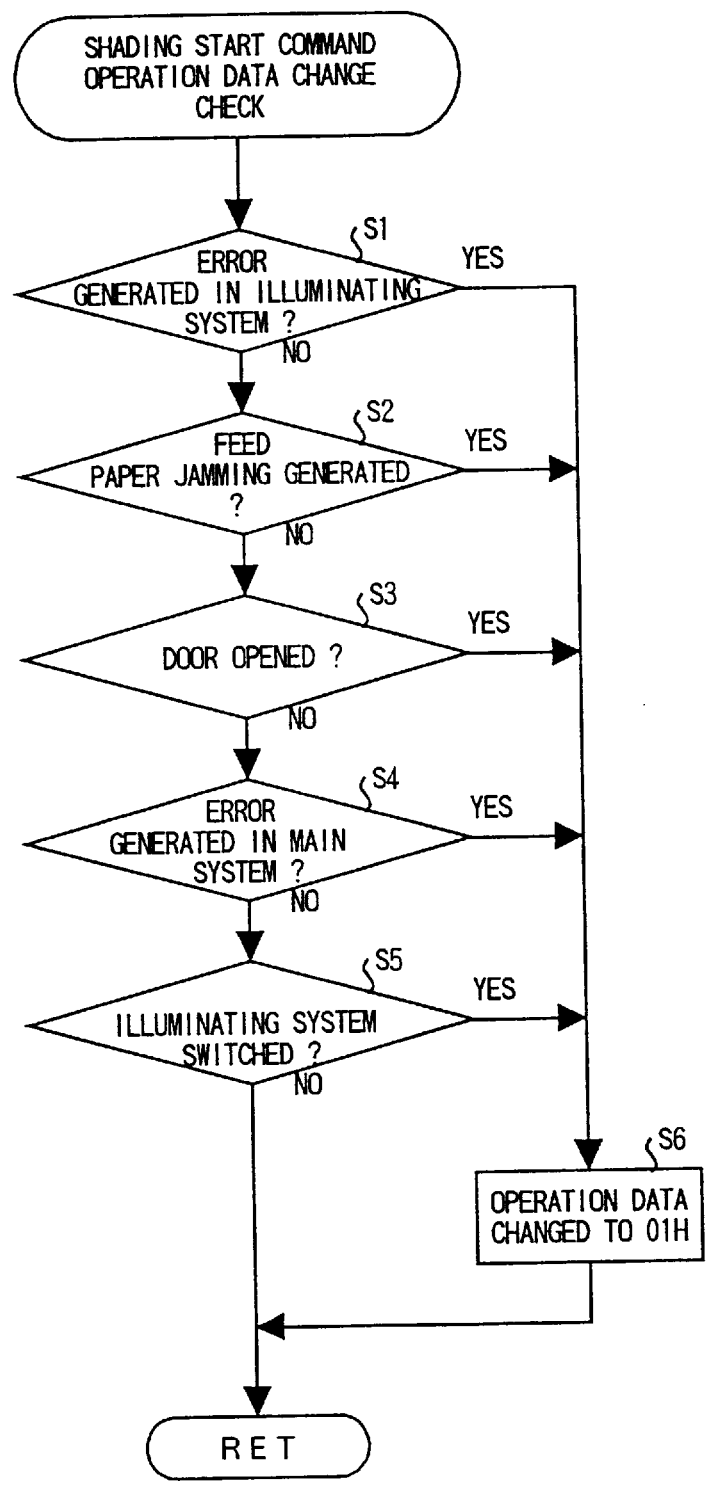
FIG. 8 is a flow chart showing operations for checking whether data for a shading start command operation has been changed or not.

To avoid this kind of case, it is required to provide particular controls. The particular controls are shown in FIG. 8. The processing shown in a flow chart of FIG. 8 is executed in the main control section by turning ON the print switch.

Figure 10:
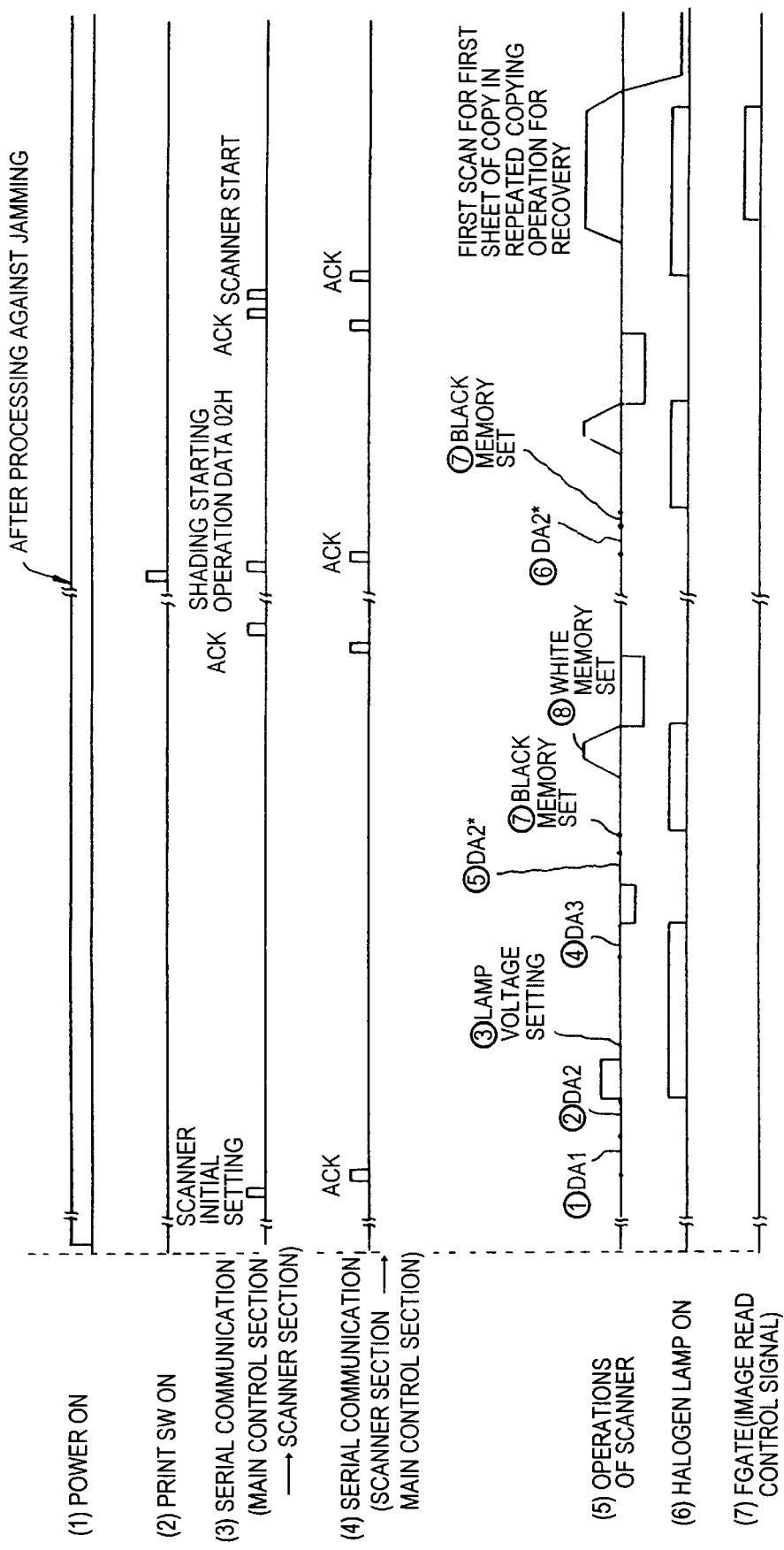
FIG. 10 is a timing chart showing controls provided when an error is generated and illumination is switched.
Figure 11:
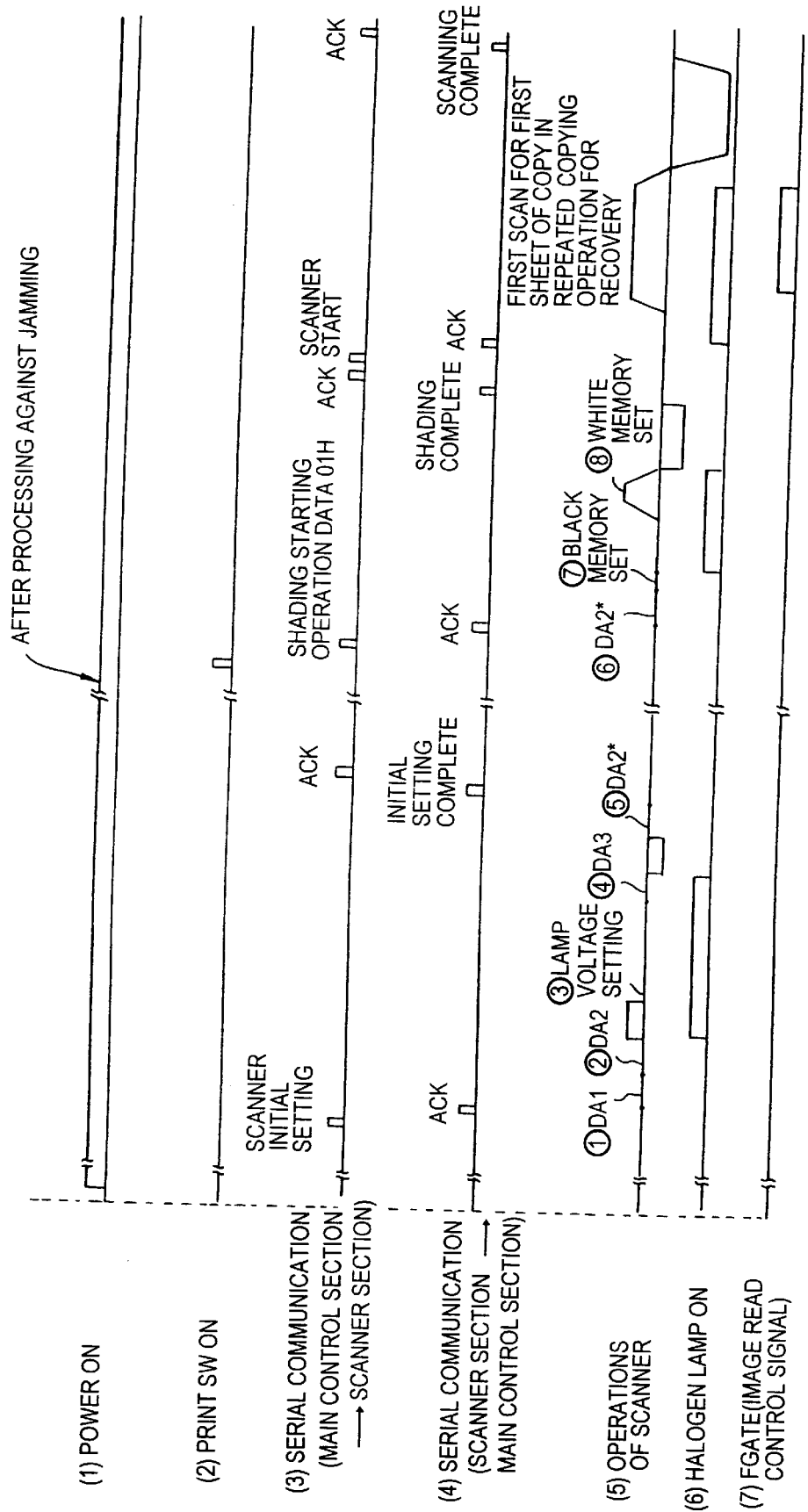
FIG. 11 is a timing chart showing controls provided when an error is generated and illumination is switched.

In cases where, as shown in FIG. 8, fetching is executed in a state before turning ON the print switch, any error generated in the illumination system/the main body system is solved, or feed paper jamming or door-open is solved, and furthermore in a case where switching back is executed in the illumination system, data is changed to data for shading operation 01H in place of data for shading operation 02H. With this configuration, the operation shown in FIG. 10 is changed to the operation shown in FIG. 11, and for this reason the inconvenience as described above (jamming as example) is resolved.

Detailed description is made for the flow chart shown in FIG. 8. At first determination is made as to whether any error has been generated in the illumination system or not (S1), and in a case where it is determined that no error has been generated therein, then determination is made as to whether feed paper jamming has been generated or not (S2), and in a case where it is determined that the jamming has not been generated, then determination is made as to whether a door in the apparatus is opened or not (S3), and in a case where it is determined that the door is not opened, then determination is made as to whether any error has been generated in the main body system or not (S4), and in a case where it is determined that no error has been generated therein, then determination is made as to whether switching for the illumination system has been executed or not (S5), and in a case where switching has not been executed therein, then the processing is returned to the initial step.

In addition, in the determination in steps S1 to step S5 as described above, in a case of YES in each of the determination, operating data is changed to O1H (S6), and then the processing is returned to the initial step.

Next, a description is made for a case where precision of shading white data is improved by adding preliminary lighting up to the operations only when recovering from any error or switching for illumination is executed.

Figure 9:
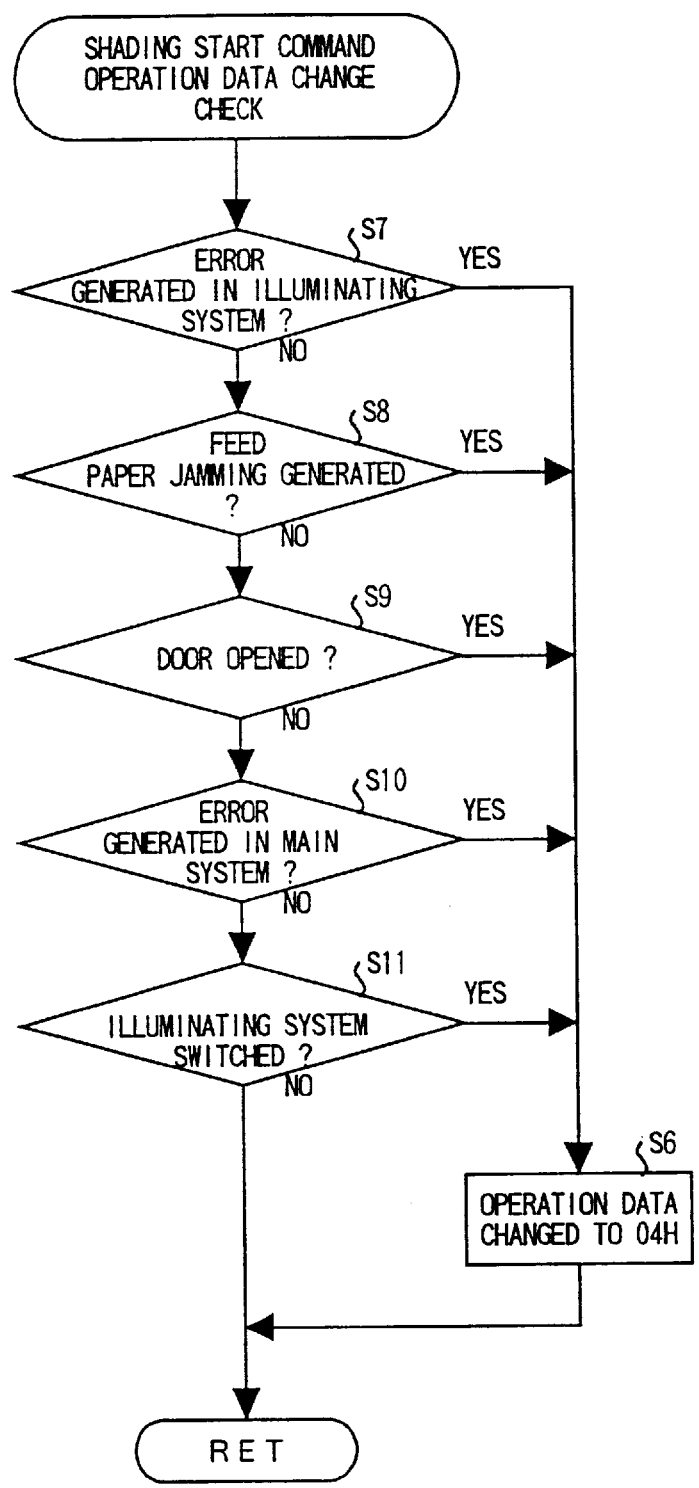
FIG. 9 is a flow chart showing operations for checking whether data for a shading start command operation has been changed or not.
Figure 12:
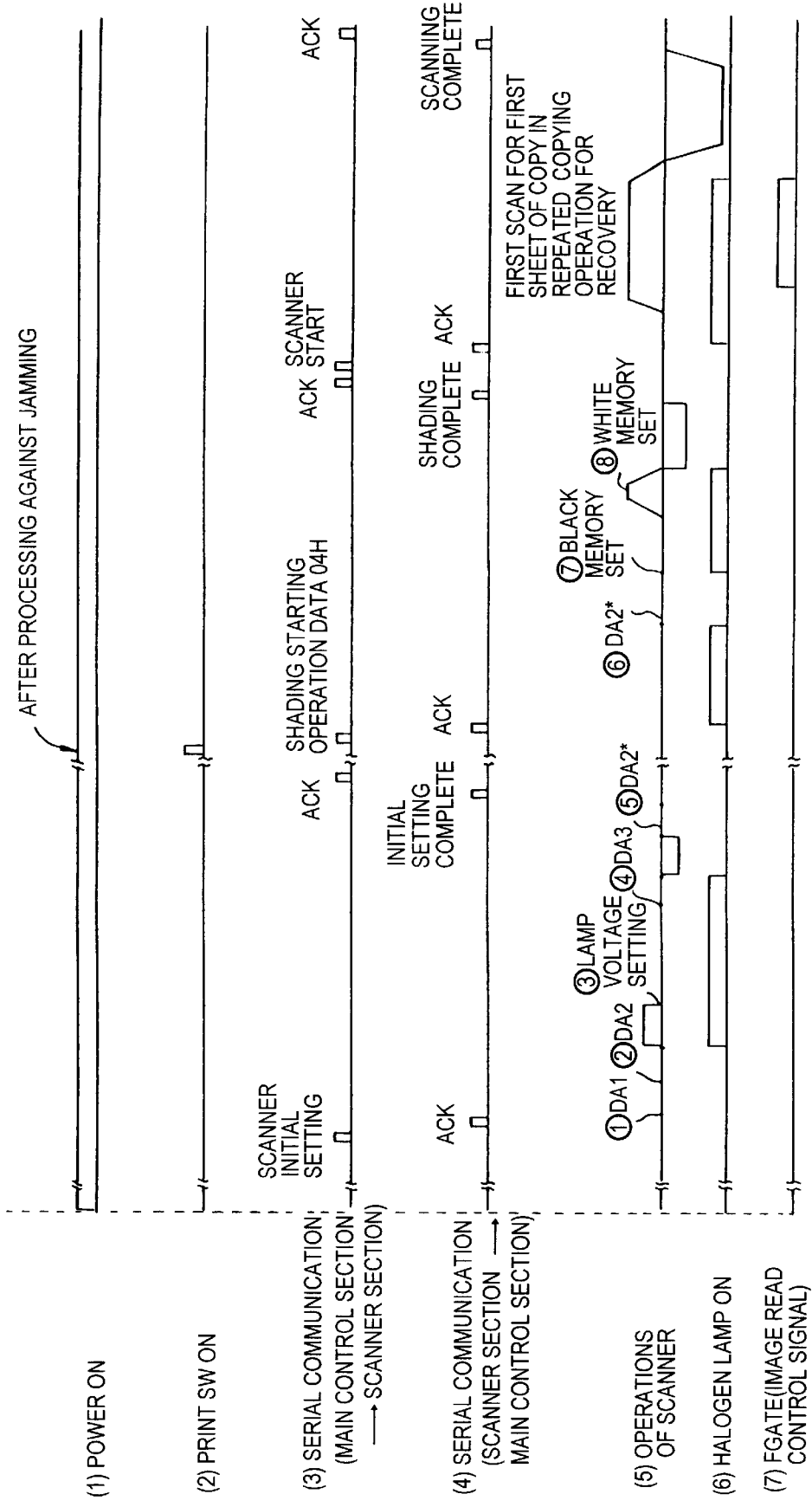
FIG. 12 is a timing chart showing controls provided when an error is generated and illumination is switched.

The operations shown in FIG. 9 are executed in the main control section after the print switch is turned ON. Like the embodiment as described above, in a general case, the operations according to operating data 02H for not executing white memory set as shown in FIG. 10 are executed, but in this case, preliminary lighting up is executed shown in FIG. 12 by transmitting data in operating data 04H to the scanner section, and after this operation white memory set is executed, which makes it possible to obtain high-precision white data.

Detailed description is made for a flow chart shown in FIG. 9. At first determination is made as to whether any error has been generated in the illumination system or not (S7), and in a case where it is determined that no error has been generated therein, then determination is made as to whether feed paper jamming has been generated or not (S8), and in a case where it is determined that the jamming has not been generated, then determination is made as to whether a door in the apparatus is opened or not (S9), and in a case where it is determined that the door is not opened, then determination is made as to whether any error has been generated in the main body system or not (S10), and in a case where it is determined that no error has been generated therein, then determination is made as to whether switching for the illumination system has been executed or not (S11), and in a case where switching has not been executed therein, then the processing is returned to the initial step.

In addition, in the determination in steps S7 to step S11 as described above, in a case of YES in each of the determination, operating data is changed to 04H (S12), and then the processing is returned to the initial step.

Next, a description is made for another embodiment of the present invention.

Figure 17:
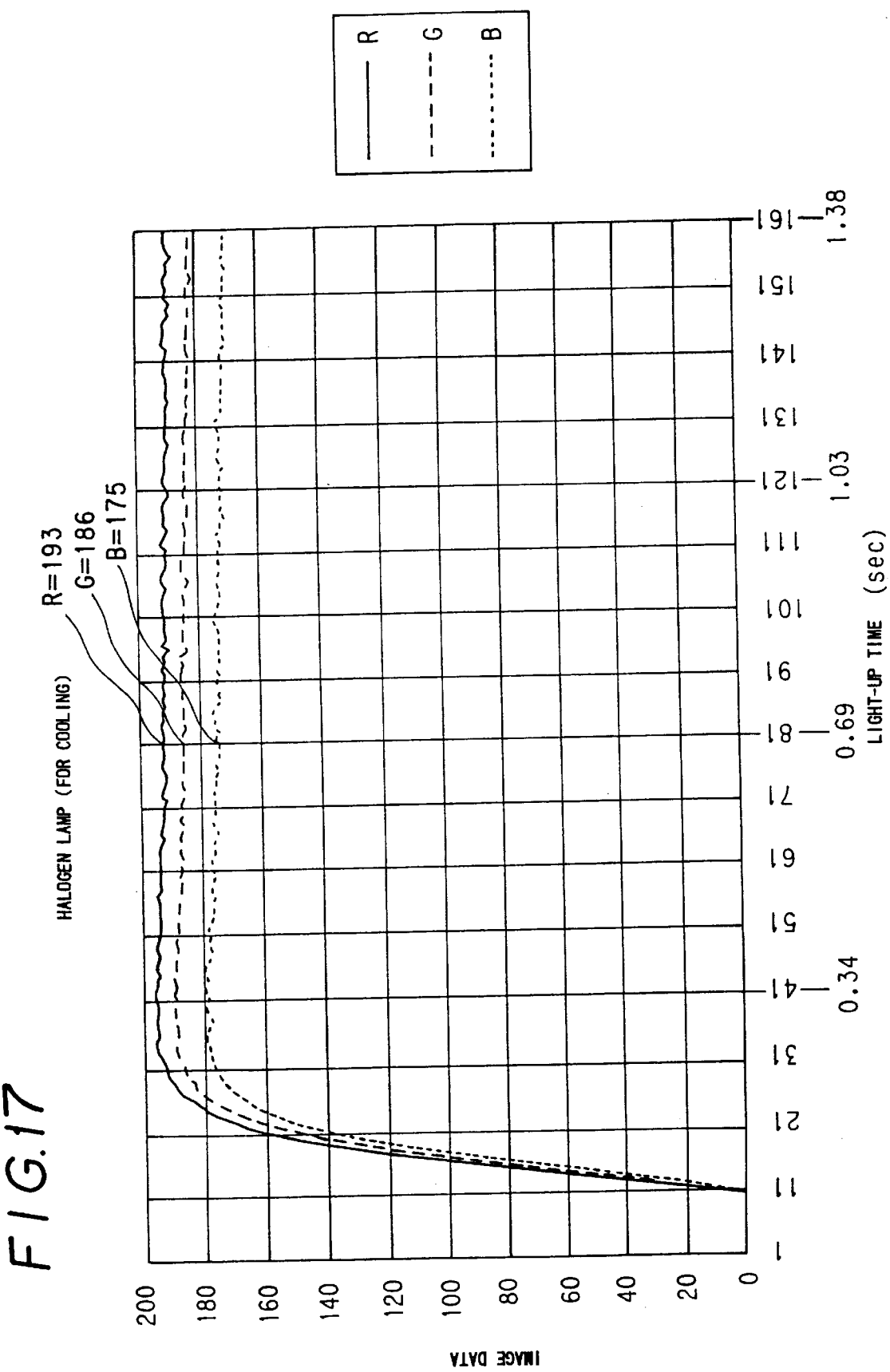
FIG. 17 is a graph showing output values of image data for R, G, and B lights in the cool state of a halogen lamp relating to change in quantity of light thereof.
Figure 18:
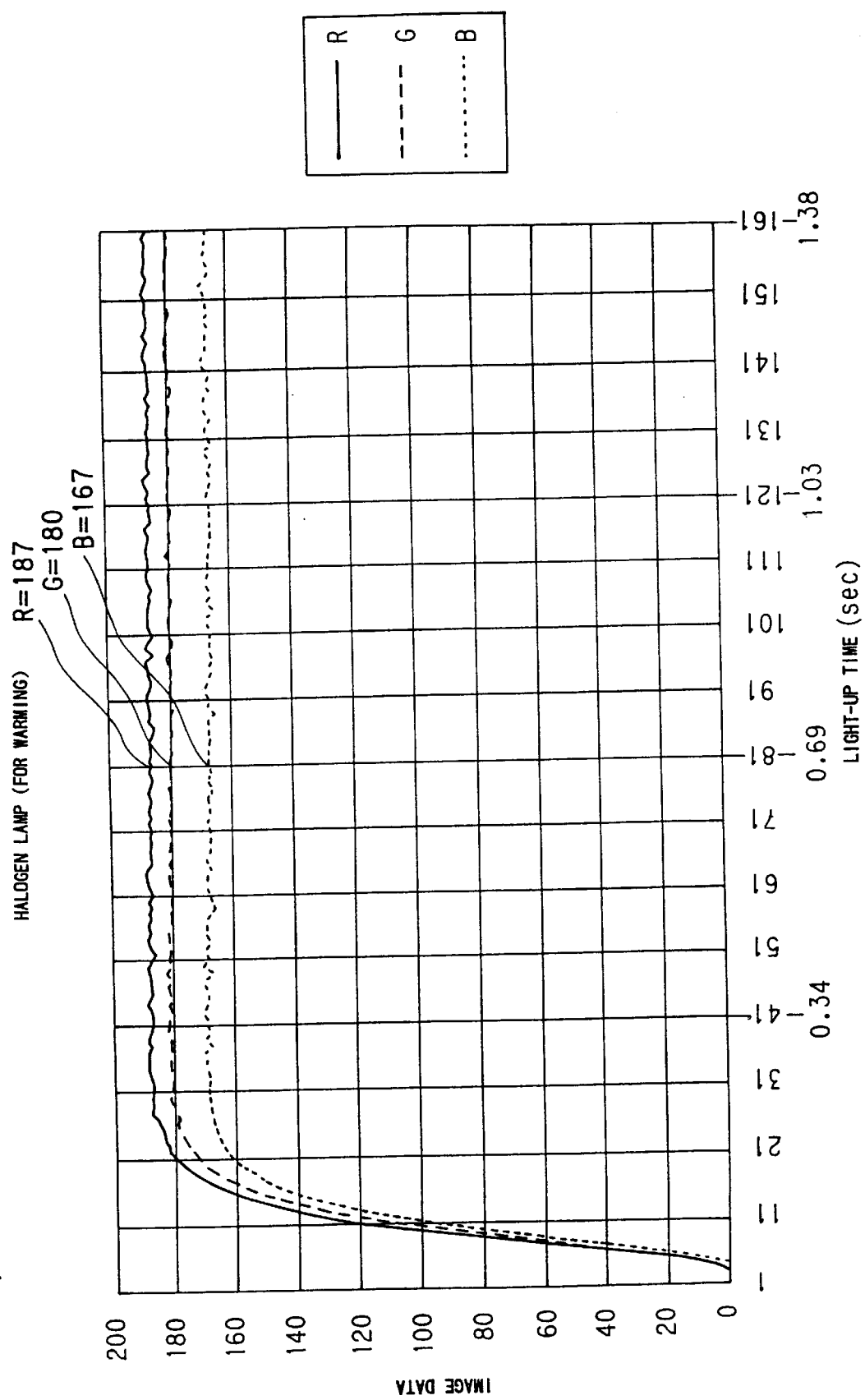
FIG. 18 is a graph showing output values of image data for R, G, and B lights in the warmed-up state of the halogen lamp relating to change in quantity of light.
Figure 19:
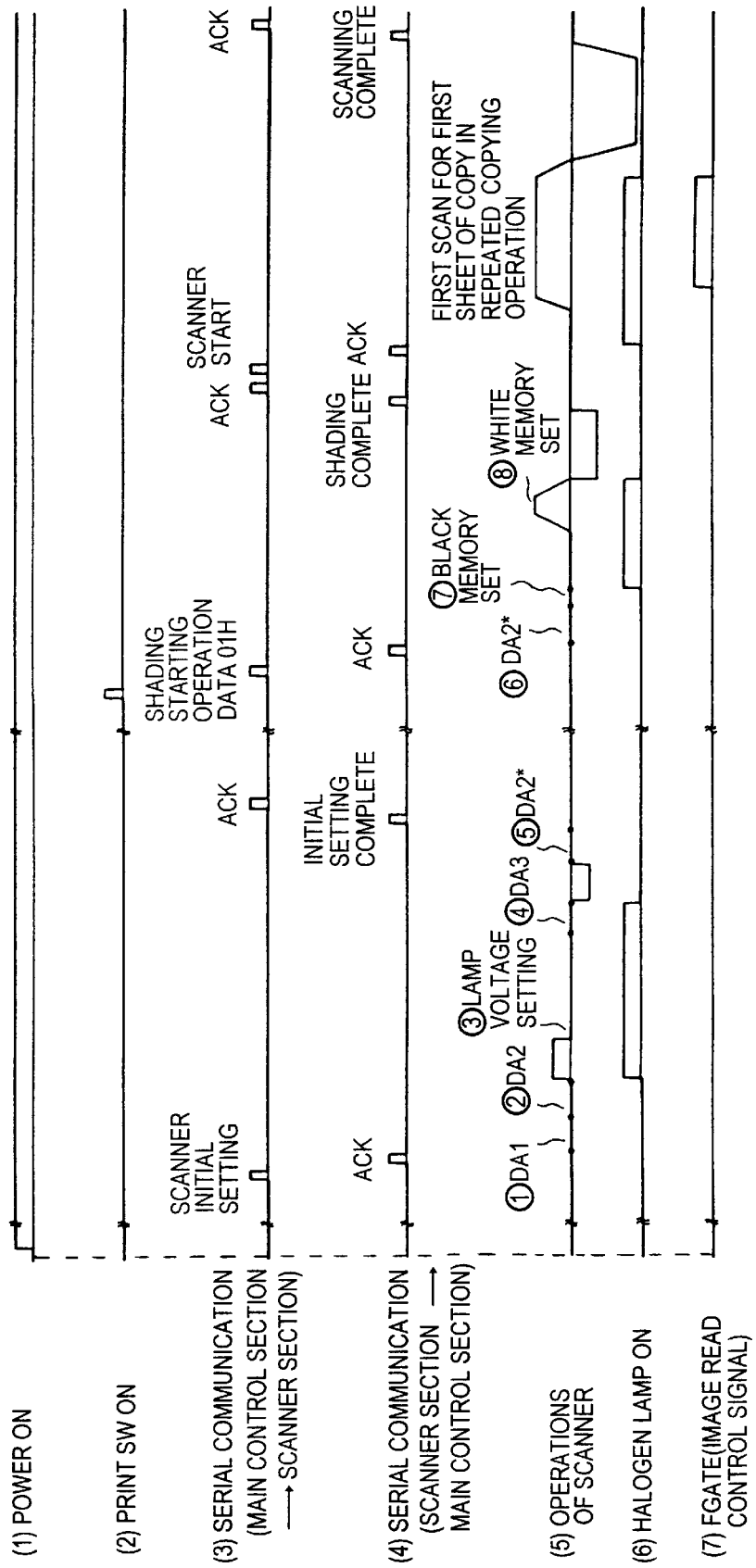
FIG. 19 is a timing chart showing operations for fetching shading correction data and for scanning after a print switch is pressed in the conventional technology.
Figure 20:
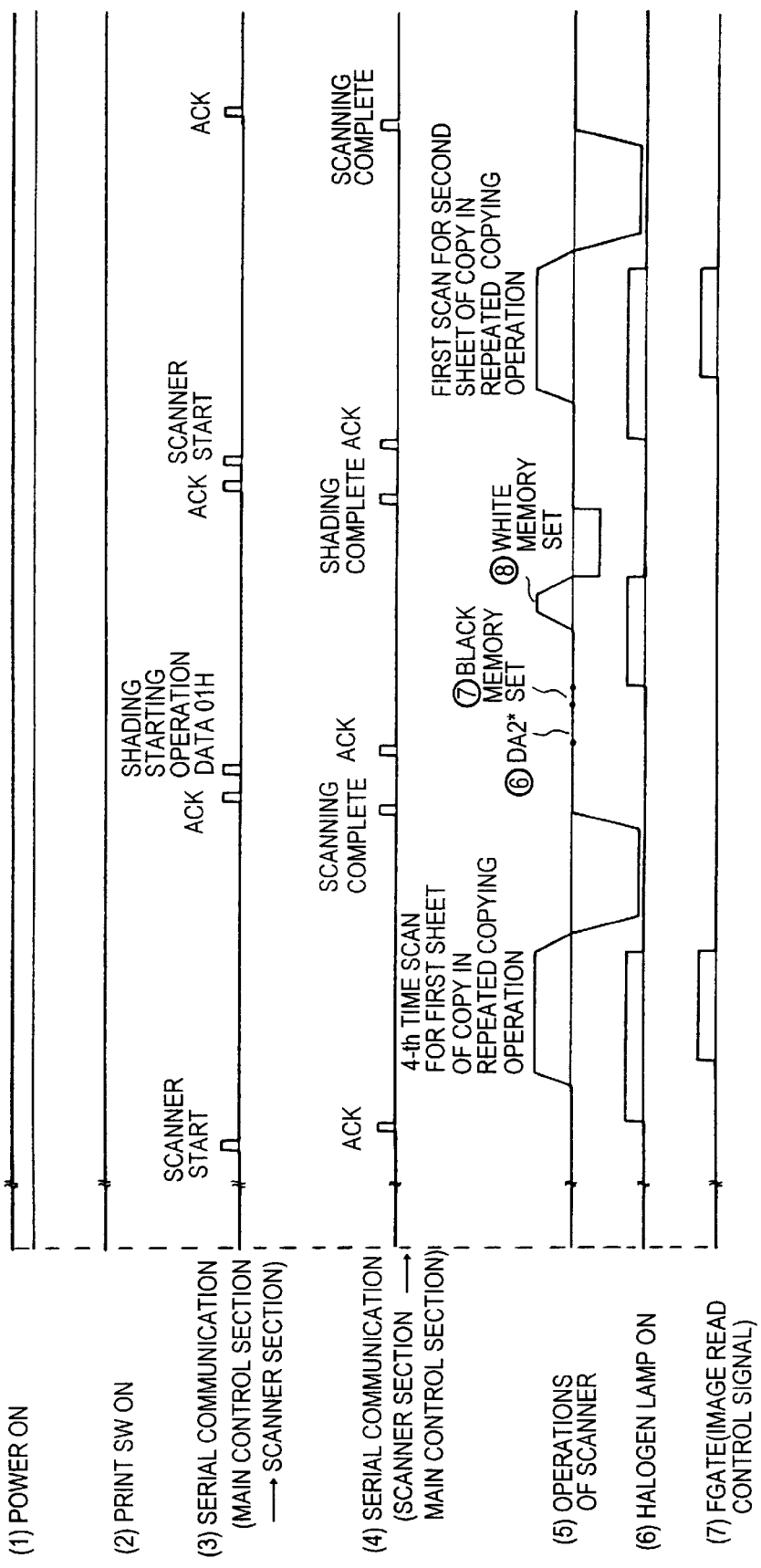
FIG. 20 is a timing chart showing operations for fetching shading correction data and for scanning after a print switch is pressed in the conventional technology.

In the scanner section 300 according to the present invention, white reference data for shading correction is fetched in 0.69 sec after the halogen lamp 101 is lit, and a difference of output from the halogen lamp 101 for each color at this point of time between a case where the halogen lamp 101 is lit in the cool state as shown in FIG. 17 and a case where the halogen lamp 101 is lit in the warmed-up state as shown in FIG. 18 is 3.2% for R, 3.3% for G, and 4.8% for B. It should be noted that the values are ones theoretically computed from the temperature characteristics of the halogen lamp 101, and it is known that the actual difference is larger than the values above. For this reason, as described in relation to the conventional technology, images are read by the scanner section 300 successively, the reference data for shading correction to a second sheet of copy and on is different from that for a first sheet of copy, and color balance in a copied image in a second or subsequent sheet of copy varies from that for a first sheet of copy.

To solve the problems as described above, in the scanner section 300 according to the present invention, in a case where the halogen lamp 101 is lit in the cool state, amplitude of light emitted from the halogen lamp 101 is corrected to a reference value by lowering the driving power to prevent change in the reference data for shading correction. More specifically, in the scanner section 300 of the color scanner 100 according to the present embodiment, when the microcomputer 305 detects that driving of the halogen lamp 101 by the lamp regulator 349 is started in the reference time previously set to, for instance, 1 minute, the microcomputer 305 controls the D/A converter 311 according to correction data set in the RAM 307, and power supplied from the lamp regulator 349 to the halogen lamp 101 is reduced by the D/A converter 311.

With this configuration, amplitude of light emitted from the halogen lamp 101 is always kept at a constant level, so that, in a case where color images are successively copied with the color scanner 100, it becomes possible to prevent color balance in a first sheet of copy from being different from that for a second or subsequent sheet of copy, which contributes to improvement of the color scanner 100. As for the correction data previously set in the RAM 307, change in amplitude of light emitted from the halogen lamp 101 is obtained from the output characteristics thereof, a load voltage insuring the identical light emission amplitude is outputted from the lamp regulator 349.

Furthermore in the scanner section 300, correction data is stored in the RAM 307 in which stored data can freely be rewritten, so that the correction data can be rewritten by accessing the RAM 307 from the serial interface timer 312, which makes it possible, for instance, to modify the correction data according to a difference between individual halogen lamps 101 in the production step, or to modify the correction data in response to the halogen lamp 101 exchanged in maintenance, and for this reason it is possible to set accurate correction data, which in turn contributes to improvement of performance of the color scanner 100.

Also by realizing configuration in which correction data stored in the RAM 307 can freely be rewritten by inputting necessary data or parameters from the operation display sections 370, it is possible to readily modify the correction data in a case where the halogen lamp 101 as consumable is exchanged with another one by a service engineer. It should be noted that, although description of the present embodiment assumes a case where correction data is stored in the RAM 307 in which stored data can freely be rewritten, it is possible to set the correction data unchangeably in the ROM 306 or the like.

Furthermore in the scanner section 300, it is also possible for the microcomputer 305 to compute correction data and store the data in the RAM 307. In a case where automatic setting as described above is executed, for instance, power supplied from the lamp regulator 349 in 1 minute after completion of initial setting is controlled to a certain level with the white reference board illuminated by the halogen lamp 101, and the reflected light is photoelectrically converted by the 3-line CCD 106 to detect first white reference data for the cool state of the halogen lamp 101. Then the halogen lamp 101 is lit for around 1 second and then kept OFF for around 0.5 second, then the halogen lamp 101 is lit again and the reflected light from the white reference board is photoelectrically converted by the 3-line CCD 106 to detect second white reference data for the warmed-up state.

With the configuration as described above, by controlling timing of operations of the shading gate arrays 323 to 325 set in the data through mode with the timing gate array 308 by means of subjecting the first and second reference data to A/D conversion with the A/D converter s 314 to 319, maximum values of additional averages for the first and second reference data are computed. The microcomputer 305 executes a specific computing sequence according to the maximum values to obtain the correction data and store the data in the RAM 307.

With this configuration, accurate correction data is automatically detected and set in the RAM 307, so that, for instance, in a case where correction data is corrected according to a difference between individual halogen lamps 101 during the production step, or in a case where correction data is modified according to the halogen lamp 101 replaced with new one in maintenance, it is not necessary for an operator or a service engineer to manually correct the correction data, which contributes to improvement of productivity or adaptability for maintenance of the color scanner 100.

Next, a description is made for still another embodiment of the present invention. At first, in the scanner section 300 which is an image reading apparatus according to the present embodiment, as shown in FIG. 3, correction data is previously stored in the RAM 307 as a medium in which data stored therein can freely be rewritten, and this correction data is set so that the reference voltages for A/D converter s 314 to 319 is increased. In addition, a operation started detecting means for detecting the fact that driving of the halogen lamp 101 by the lamp regulator 349 is started after a reference period of time specified previously has passed comprises the microcomputer 305 or the like, and a conversion correcting means for increasing reference voltages for the A/D converter s 314 to 319 with the correction data set in the RAM 307 according to the detection output comprises the microcomputer 305 or the D/A converter s 310, 311.

More specifically, the expressions for computing the reference voltages for the A/D converter s 314 to 319 are previously set as those shown below in the microcomputer 305:

$RE\_DA3BF \times A \rightarrow RE\_DA3$ $RO\_DA3BF \times A \rightarrow RO\_DA3$ $GE\_DA3BF \times B \rightarrow RE\_DA3$ $GO\_DA3BF \times B \rightarrow RO\_DA3$ $BE\_DA3BF \times C \rightarrow RE\_DA3$ $BO\_DA3BF \times C \rightarrow RO\_DA3$ and the expressions include parameters A to C corresponding to R, G, and B respectively, as shown above.

Figure 14:
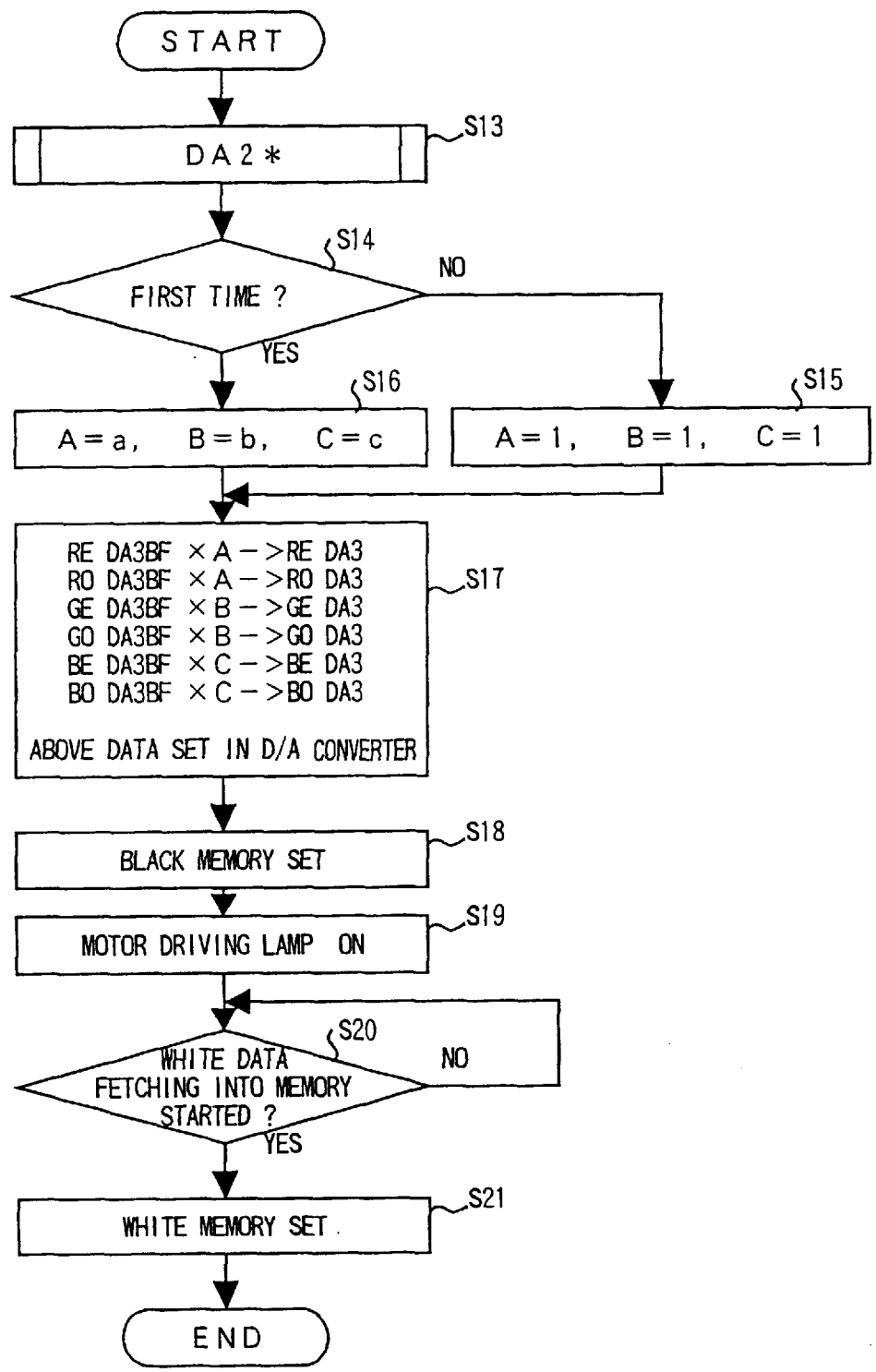
FIG. 14 is a flow chart showing a processing for shading correction in the scanner section.

With the configuration as described above, as shown in FIG. 14, in a case where reference data for shading correction is read prior to reading of image data, determination is made in fine adjustment for black level offsetting (DA2*) (S13) as to whether the halogen lamp 101 was lit for the first time or not (S14). If the lighting up is not the first time, a reference value 1 is set in each of the parameters A to C in the expressions to indicate that the halogen lamp 101 is in the warmed up state (S15), and the subsequent operations are executed like in the conventional technology.

If the halogen lamp 101 was lit first, it is regarded that the halogen lamp 101 is in the cool state, correction data a to c is read from the RAM 307 (S16), and the correction data a to c is set in each of the parameters A to C in the expressions respectively (S17). In the scanner section 300 actually designed by the present inventor, the output difference in a case where the reference data is read in 0.69 sec after the halogen lamp 101 is lit as described above was 3.2% for R, 3.3% for G, and 4.8% for B, and the correction data corresponding to the output differences above was 1.033 for a, 1.044 for b, and 1.048 for c.

As a result of computing through the expressions with the correction data a to c set in the parameters A to C respectively is outputted to the D/A converter s 310, 311, so that the reference voltages loaded from the D/A converter s 310, 311 to the A/D converter 314 are also increased. So the black reference data, white reference data, and image data converted according to the increased reference voltage Vref compensates the increased amplitude of the light emitted the halogen lamp 101, and the subsequent operations are executed like in the conventional technology (namely, black memory set (S18), motor driving lamp ON (S19), determination as to whether fetching into white memory has been started or not (S20), and white memory set (S21)).

With this configuration, even if amplitude of light emitted from the halogen lamp 101 changes, a result of shading correction is always uniform, so that, in a case where a color image is successively copied with the color scanner 100, it is possible to prevent color balance in a copied image in a second or subsequent sheet from being different from that in a first sheet, which contributes to improvement of the reliability of the color scanner 100.

Furthermore in the scanner section 300 according to the present embodiment, correction data is stored in the RAM 307 in which data stored therein can freely be rewritten, so that the correction data can be rewritten, for instance, by accessing the RAM 307 from the serial interface 312, and it is possible to, for instance, modify correction data in response to a difference between individual halogen lamps 101, in the production state or to modify the correction data in response to the halogen lamp 101 exchanged with a new one in maintenance, so that it is possible to improve performance of the color scanner 100 by setting accurate correction data.

With the configuration in which correction data stored in the RAM 307 can freely be rewritten according to input operation from the operation display section 370, correction data can easily be modified in a case where the halogen lamp 101 as consumables is exchanged with a new one by a service engineer. It should be noted that, although description of the present embodiment assumes a case where correction data is stored in the RAM 307 in which data stored therein can freely be rewritten, the correction data can unchangeably be set in the ROM 306 or the like.

Furthermore, in the scanner section 300 according to the present embodiment, the data collecting means for detecting first and second reference data by controlling power supplied from the lamp regulator 349 at a constant level and photoelectrically converting the reflected light from the white reference board illuminated by the halogen lamp 101 with the 3-line CCD 106 in repetition is formed with the microcomputer 305 or the D/A converter 311. And the data computing means for computing correction data according to the first and second reference data outputted from the data collecting means comprises the shading data arrays 323 to 325, or the microcomputer 305, or the timing gate array 308, and a data storage means for storing the correction data computed by this data computing means in the RAM 307 comprises the microcomputer 305 or the like. And in the microcomputer 305, the expressions for computing the correction data a to c based on the first reference data of RE_MAX1, RO_MAX, ..., BO_MAX1 and the second reference data of RE_MAX2, RO_MAX2, ..., BO_MAX2 are previously set as the following ones:

$$(RE\_MAX1+RO\_MAX1)/(RE\_MAX2+RO\_MAX2)=a$$

$$(GE\_MAX1+GO\_MAX1)/(GE\_MAX2+GO\_MAX2)=b$$

$$(BE\_MAX1+BO\_MAX1)/(BE\_MAX2+BO\_MAX2)=c$$

With the configuration as described above, it is also possible for the microcomputer 305 to compute correction data and store the data in the RAM 307. So in a case where the correction data as described above is automatically set, as shown in FIG. 15, in 1 minute after initialization is complete, power supplied from the lamp regulator 349 is controlled to a constant value, the white reference board is illuminated by the halogen lamp 101, and the reflected light is photoelectrically converted by the 3-line CCD 106, and thus the first white reference data for the cool state of the halogen lamp 101 is detected.

Figure 16:
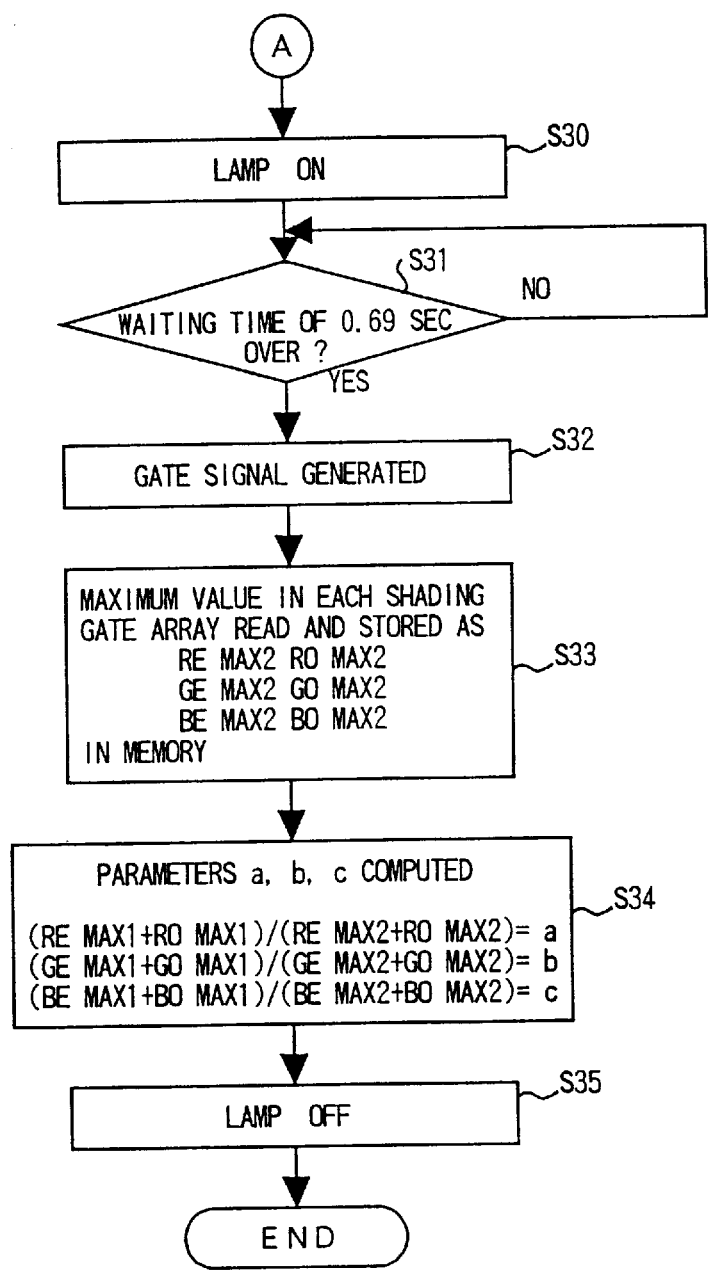
FIG. 16 is a flow chart showing a second half section in the processing for computing correction data in the scanner section.

Then the halogen lamp 101 is lit for around 1 second and then kept OFF for around 0.5 sec, and then as shown in FIG. 16, the halogen lamp is again lint, and the reflected light from the white reference board is photoelectrically converted by the 3-line CCD 106 to detect the second white reference data for the warmed-up state. Then the first and second reference data is subjected to A/D conversion in the A/D converter s 314 to 319, and operating timing of the shading gate arrays 323 to 325 set in the data through mode is controlled by the timing gate array 308 to compute maximum values of additional averages for the first and second reference data, then microcomputer 305 executes computing described above according to the maximum values to compute the correction data and store the data in the RAM 307.

Figure 15:
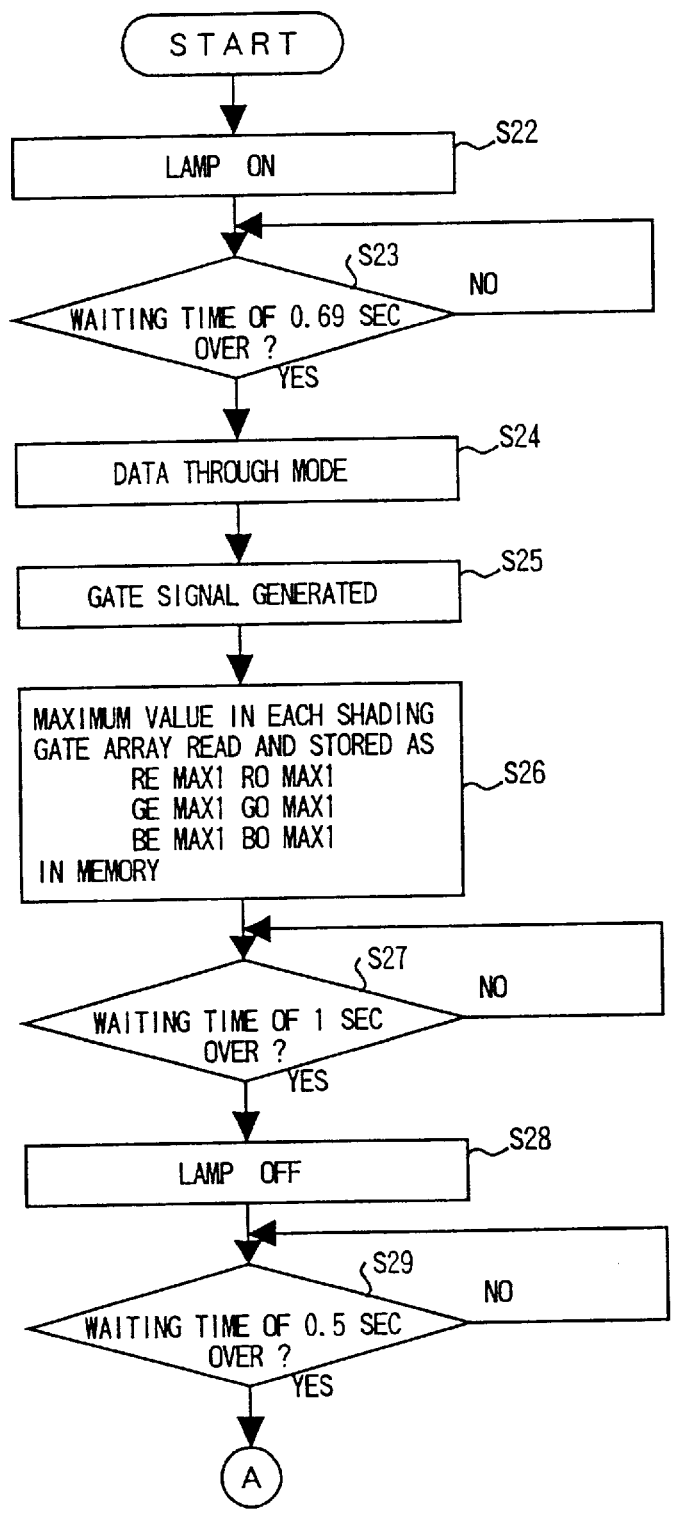
FIG. 15 is a flow chart showing a first half section in a processing for computing correction data in the scanner section.

Now description is made for the operations described above with reference to the flow charts shown in FIG. 15 and FIG. 16. At first, when the halogen lamp 101 is turned ON (S22), determination is made as to whether the period of time of 0.69 sec has passed or not (S23), and if it is determined that the period of time of 0.69 sec has passed, the operating mode is set in the data through mode (S24). Then a gate signal is generated (S25), a maximum value for each shading gate array is read and stored in the RAM 307 (S26). Then determination is made as to whether the period of time of 1 sec has passed or not (S27), and if it is determined that the period of time of 1 sec has passed, the halogen lamp 101 is turned OFF (S28).

Then determination is made as to whether a period of time of 0.5 sec has passed or not (S29), and if it is determined that the period of time of 0.5 sec has passed, the halogen lamp 101 is turned ON (S30). Then determination is made as to whether a period of time of 0.69 sec has passed or not (S31), and if it is determined that the period of time of 0.69 sec has passed, a gate signal is generated (S32), a maximum value for each shading gate array is read and stored in the RAM 307 (S33). Then the parameters a, b, c are computed (S34), the halogen lamp 101 is turned OFF (S35), and the processing sequence is terminated.

With the configuration as described above, accurate correction data is automatically detected and set in the RAM 307, and it is not necessary for an operator or a service engineer to manually modify the correction data, for instance, in a case where the correction data is modified in response to a difference of each individual halogen lamp 101, in the production step, or in a case where the correction data is modified for the halogen lamp 101 exchanged with a new one in maintenance, which can contribute to improvement of the productivity and adaptability to maintenance of the color scanner 100.

As described above, in the image forming apparatus according to the present invention, with the scanner control means, controls are provided so that first white reference data fetching after power turn ON is executed in a stable region for the illuminating means, shading correction is executed by the shading correcting means and an image is formed first time, and shading-corrected white data is fetched for a second sheet and on in continuously repeated copying operations each time one image is formed, and for this reason, stable shading correction can be realized regardless of change in quantity of light due to internal temperature characteristics of a halogen lamp, change of image density generated when continuous copying operations are executed is suppressed, and a high quality image can be obtained thereby.

In the image forming apparatus according to the present invention, with the scanner control means, preliminarily lighting up the illuminating means is executed and white data with shading corrected for each copy is fetched in a case where full color copying mode is selected in the input means, shading correction is executed without preliminarily lighting up the illuminating means between copies in a case where mono-color copying mode is selected therein, and for this reason, stable shading correction can be realized regardless of change in quantity of light due to internal temperature characteristics of a halogen lamp, change of image density generated continuous copying operations are executed is suppressed, a high quality image can be obtained, and at the same time a first copying speed can be realized when mono-color copying is selected.

In the image forming apparatus according to the present invention, with the scanner control means, shading correction is executed without preliminarily lighting up the illumination means in a case where the 1 to 1 copying mode (where a copy is prepared for one sheet of draft) is selected in the input means, and also preliminary lighting up of the illuminating means is executed and white data with shading corrected for each copy is fetched in a case where the 1 to N copying mode (repeated copying mode) is selected in the input means, and for this reason, stable shading correction can be realized regardless of change in quantity of light due to internal temperature characteristics of a halogen lamp, change of image density generated continuous copying operations are executed is automatically suppressed when the 1 to N copying mode is selected, a high quality image and an operation capability can be improved, and at the same time a fast processing speed at the time when the 1 to 1 copying mode is selected can be realized.

In the image forming apparatus according to the present invention, in a case where any error happens to be generated in the illuminating means only when shading-corrected white data is fetched, for instance, by a lamp being turned OFF due to a fault in contact to a lamp terminal section or connection section and due to thermal fuse, white reference data is not normally recognized. So, as a processing to be executed when an error that fetching the white reference data is not normally executed is generated, when preparing a first sheet of copy after the error is solved, priority is put not on a processing against change in density due to fine change in a quantity of light generated by a lamp, but on easy fast recovery after the error is solved, so that a waste of time for preliminary lighting up can be reduced and a first copying speed can be realized.

In the image forming apparatus according to the present invention, when any feed paper jamming is generated in the image forming apparatus, power for the AC system is turned OFF to prevent any danger and accident in the main control section. With this operation, power supplied from the lamp regulator is turned OFF, and the reliability of white reference data becomes lower. So, as a processing to be executed when an error that fetching the white reference data is not normally executed is generated, when preparing a first sheet of copy after the jamming is solved, priority is put not on a processing against change in quantity due to fine change in a quantity of light emitted from the lamp after the jamming is overcome, but on easy and fast recovery after jamming is overcome, so that a waste of time for preliminary lighting up can be reduced and a first copying speed can be realized.

In the image forming apparatus according to the present invention, when a door of the image forming apparatus is opened during its operation, power for the AC system is turned OFF to prevent any danger and accident in the main control section. With this operation, power supplied from the lamp regulator is turned OFF, and the reliability of white reference data becomes lower. So, as a processing to be executed when an error that fetching the white reference data is not normally executed is generated, when preparing a first sheet of copy after the door is closed, priority is put not on a processing against change in quantity due to fine change in a quantity of light emitted from the lamp, but on easy and fast recovery after the door is closed, so that a waste of time for preliminary lighting up can be reduced and a first copying speed can be realized.

In the image forming apparatus according to the present invention, when an error is generated in the main body of the image forming apparatus and a service man is to be called for it, power for the AC system is turned OFF to prevent any danger and accident in the main control section. With this operation, power supplied from the lamp regulator is turned OFF, and the reliability of white reference data becomes lower. So, as a processing to be executed when an error that fetching the white reference data is not normally executed is generated, when preparing a first sheet of copy after the error in the main body thereof is solved, priority is put not on a processing against change in density due to fine change in a quantity of light emitted from the lamp, but on easy and first recovery after the error in the main body is solved, so that a waste of time for preliminary lighting up can be reduce and a fast copying speed can be realized.

In the image forming apparatus according to the present invention, in a case where there are a plurality of illuminating means, because a form of shading varies in each illuminating means, the white reference data is reset each time illuminating means is switched. With this operation, accurate shading correction can be realized even an illuminating means is switched to any other one.

In the image forming apparatus according to the present invention, as a general example of switching of an illuminating means, there are a normal (reflected light) mode for reading normal reflected light and a transmitted light mode for reading back light or transmitted light from a film projector, and correction suited to each shading form can be selected after the operating mode is switched.

In the image forming apparatus according to the present invention, by preliminarily lighting up after recovering from various errors and switching of an illuminating means, high-precision white shading data can be obtained.

In the image forming apparatus according to the present invention, change in amplitude of light emitted from an image illuminating light source associated with lapse of time can be prevented, so that a result of processing for shading correction can be prevented from its variation with excellent image quality maintained and especially in a case where a color image is read, change in a color balance can be prevented, which contributes to improvement of the reliability of an image reading device.

In the image forming apparatus according to the present invention, correction data preset in the data storage means can easily be modified, so that, for instance, correction data can be modified corresponding to each type of image illuminating light sources when copying is executed, or correction data can be modified corresponding to an image illuminating light source exchanged when maintenance thereof is executed, and correction data can precisely be preset, which contributes to improvement of performance of an image reading device.

In the image forming apparatus according to the present invention, appropriate correction data is automatically detected and is set in the data storage means, so that, for instance, in a case where correction data is modified corresponding to each type of image illuminating light source when copying is executed, or in a case where correction data is modified corresponding to an image illuminating light source exchanged when maintenance thereof is performed, it is not required for an operator or a service engineer to manually modify correction data, which contributes to improvement of performance of an image reading device and adaptability to maintenance thereof.

In the image forming apparatus according to the present invention, a result of processing for shading correction is always kept at a uniform level, so that good quality of read image can be maintained, and especially in a case where a color image is read, change in a color balance can be prevented, which contributes to improvement of the reliability of an image reading device.

In the image forming apparatus according to the present invention, correction data preset in the data storage means can easily be modified, so that, for instance, correction data can be modified corresponding to each type of image illuminating light sources when copying is executed, or correction data can be modified corresponding to an image illuminating light source exchanged when maintenance thereof is performed, and correction data can precisely be preset, which contributes to improvement of performance of an image reading device.

In the image forming apparatus according to the present invention, appropriate correction data is automatically detected and is set in the data storage means, so that, for instance, in a case where correction data is modified corresponding to each type of image illuminating light source when copying is executed, or in a case where correction data is modified corresponding to an image illuminating light source exchanged when maintenance thereof is performed, it is not required for an operator or a service engineer to manually modify correction data, which contributes to improvement of performance of an image reading device and adaptability to maintenance thereof.

Although the invention has been described with respect to a specific embodiment for a complete and clear disclosure, the appended claims are not to be thus limited but are to be construed as embodying all modification and alternative constructions that may occur to one skilled in the art which fairly fall within the basic teaching herein set forth.

What is claimed is:

1. An image forming apparatus comprising:

an illuminating means for illuminating a draft image;

a photoelectric converting means for receiving reflected light from a draft image obtained by illuminating the draft image with said illuminating means and photoelectrically converting the reflected light;

an amplifying means for amplifying an output signal from said photoelectric converting means;

a digital converting means for converting an analog signal from said amplifying means to a digital signal;

a shading correcting means for executing shading correction to said digital signal; and a scanner control means for providing controls so that white reference data fetching after power turn ON is executed by said shading correcting means in a stable region for said illuminating means, wherein the white reference data, set during initialization, is used when an image is formed a first time, and shading-corrected white data is fetched for a second sheet in a continuously repeated copying operation.

2. An image forming apparatus comprising:

an illuminating means for illuminating a draft image;

a photoelectric converting means for receiving reflected light from a draft image obtained by illuminating the draft image with said illuminating means and photoelectrically converting the reflected light;

an amplifying means for amplifying an output signal from said photoelectric converting means;

a digital converting means for converting an analog signal from said amplifying means to a digital signal;

a shading correcting means for executing shading correction to said digital signal;

an input means for inputting and setting a copying mode; and a scanner control means for preliminarily lighting up said illuminating means and fetching white data with shading corrected for each copy in a case where full color copying mode is selected in said input means and also executing shading correction without preliminarily lighting up said illuminating means in a case when mono-color copying mode is selected therein.

3. An image forming apparatus comprising:

an illuminating means for illuminating a draft image;

a photoelectric converting means for receiving reflected light from a draft image obtained by illuminating the draft image with said illuminating means and photoelectrically converting the reflected light;

an amplifying means for amplifying an output signal from said photoelectric converting means;

a digital converting means for converting an analog signal from said amplifying means to a digital signal;

a shading correcting means for executing shading correction to said digital signal;

an input means for inputting and setting a copying mode; and a scanner control means for executing shading correction without preliminarily lighting up said illuminating means in a case wherein 1 to 1 copying mode is selected in said input means and also preliminarily lighting up said illuminating means and executing shading correction for each copy in a case where 1 to N copying mode is selected in said input means.

4. An image forming apparatus comprising:

a plurality of illuminating means each for illuminating a draft image;

a photoelectric converting means for receiving reflected light from a draft image obtained by illuminating the draft image with said illuminating means;

an amplifying means for amplifying an output signal from said photoelectric converting means;

a digital converting means for converting an analog signal from said amplifying means to a digital signal;

a shading correcting means for executing shading correction to said digital signal; and a scanner control means for providing controls so that white reference data fetching after power turn ON is executed by said shading correcting means in a stable region for said illuminating means, wherein the white reference data, set during initialization, is used when an image is formed a first time, and shading-corrected white data is fetched for a second sheet of copy in a continuously repeated copying operation.

5. An image forming apparatus according to claim 4, wherein white reference data is fetched immediately before said image is read, and furthermore said illuminating means is preliminarily lit immediately before the operation.

6. An image forming apparatus according to claim 4, wherein said a plurality of illuminating means is an illuminating means for receiving reflected light from a draft image in a first mode as well as for receiving transmitted light in a second mode, and when switching between a mode for receiving reflected light and a mode for receiving transmitted light, white reference date is fetched immediately before an image is read for a first sheet of copy after said mode switching.

7. An image forming apparatus according of claim 6, wherein white reference data is fetched immediately before said image is read, and furthermore said illuminating means is preliminarily lit immediately before the operation.

* * * * *